US006629026B1

(12) United States Patent
Baraszu et al.

(10) Patent No.: US 6,629,026 B1
(45) Date of Patent: Sep. 30, 2003

(54) HYBRID ELECTRIC VEHICLE WITH MOTOR TORQUE FILL IN

(75) Inventors: Robert Charles Baraszu, Dearborn, MI (US); Susan Rebecca Cikanek, Wixom, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/063,339

(22) Filed: Apr. 12, 2002

(51) Int. Cl.[7] .................................................. B60K 6/02

(52) U.S. Cl. ........................... 701/22; 701/67; 180/65.2

(58) Field of Search .............................. 701/22, 66, 67; 180/65.2, 65.7; 477/5

(56) References Cited

U.S. PATENT DOCUMENTS

| | | | | |
|---|---|---|---|---|
| 4,533,011 A | | 8/1985 | Heidemeyer et al. | 180/65.2 |
| 5,337,848 A | | 8/1994 | Bader | 180/65.2 |
| 5,562,565 A | * | 10/1996 | Moroto et al. | 477/3 |
| 5,669,842 A | | 9/1997 | Schmidt | 475/5 |
| 5,755,302 A | | 5/1998 | Lutz et al. | 180/65.2 |
| 6,019,698 A | | 2/2000 | Lawrie et al. | 477/5 |
| 6,041,877 A | * | 3/2000 | Yamada et al. | 180/65.2 |
| 6,319,168 B1 | * | 11/2001 | Morris et al. | 477/5 |
| 6,416,437 B2 | * | 7/2002 | Jung | 475/8 |
| 6,533,701 B2 | * | 3/2003 | Maruyama | 477/5 |

* cited by examiner

*Primary Examiner*—Michael J. Zanelli

(74) *Attorney, Agent, or Firm*—Dykema, Gossett; Carlos L. Hanze

(57) ABSTRACT

A post-transmission, parallel hybrid electric vehicle and method of control thereof is provided having an engine 200 joined to a differential 206 by an automated layshaft transmission 212. A motor 202 is provided which additionally provides torque to the differential 206 during gear changes of the transmission 212 to minimize the affects of clutch shudder from an engine clutch 210.

22 Claims, 21 Drawing Sheets

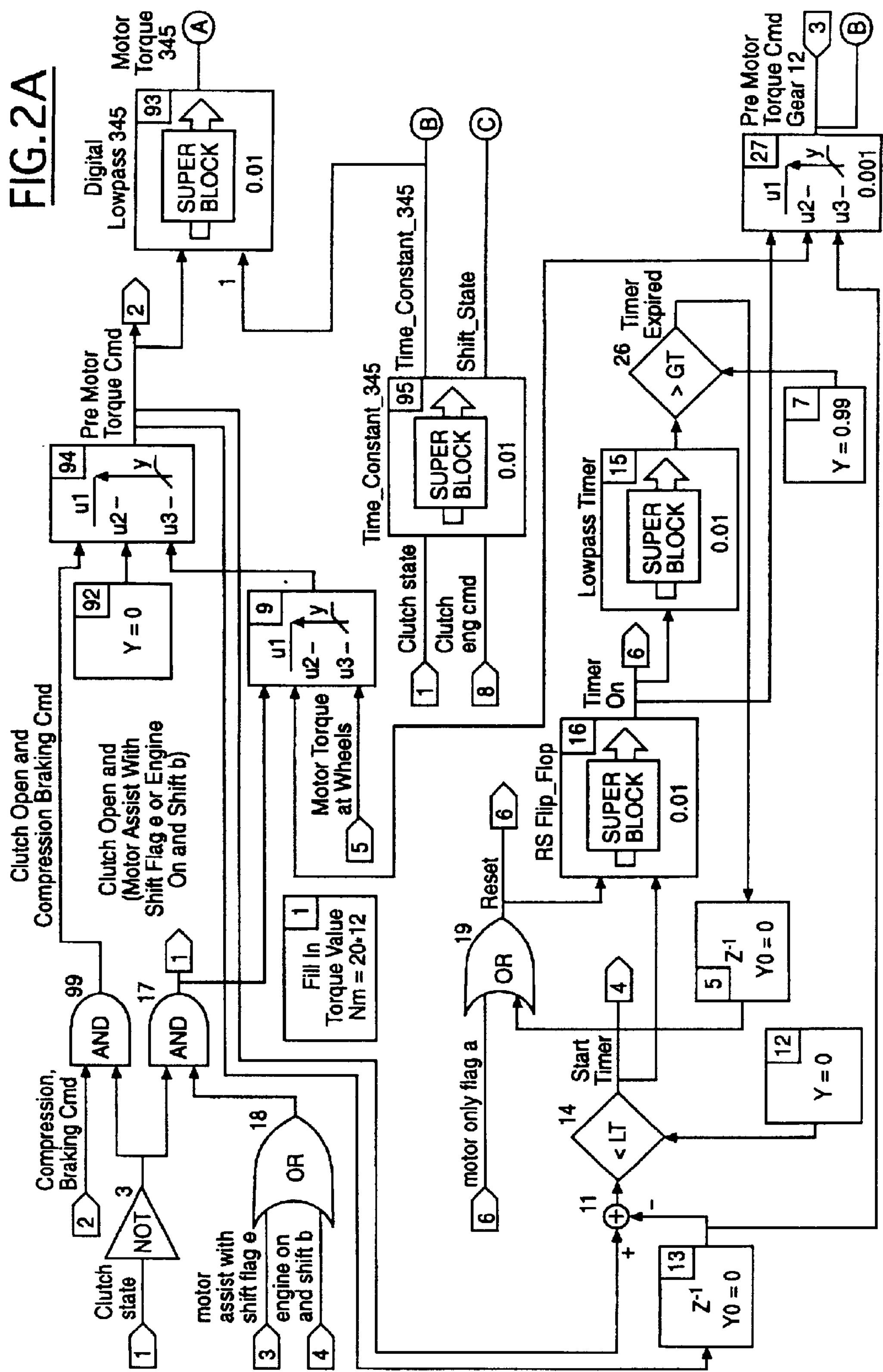
FIG.2A
Digital Lowpass 345
SUPER BLOCK
0.01
93
Motor Torque 345
A
Pre Motor Torque Cmd
2
94
u1
u2
u3
y
Clutch Open and Compression Braking Cmd
92
Y = 0
Clutch Open and (Motor Assist With Shift Flag e or Engine On and Shift b)
9
Motor Torque at Wheels
5
Fill In Torque Value Nm = 20*12
1
Compression, Braking Cmd
Clutch state
NOT
3
AND
99
17
18
OR
motor assist with shift flag e
engine on and shift b
4
Time_Constant_345
95
Shift_State
Clutch state
Clutch eng cmd
8
B
C
motor only flag a
6
19
Reset
RS Flip_Flop
16
Timer On
Lowpass Timer
15
26
> GT
Timer Expired
7
Y = 0.99
Start Timer
14
< LT
11
+
-
13
$Z^{-1}$
Y0 = 0
12
Pre Motor Torque Cmd Gear 12
27
0.001

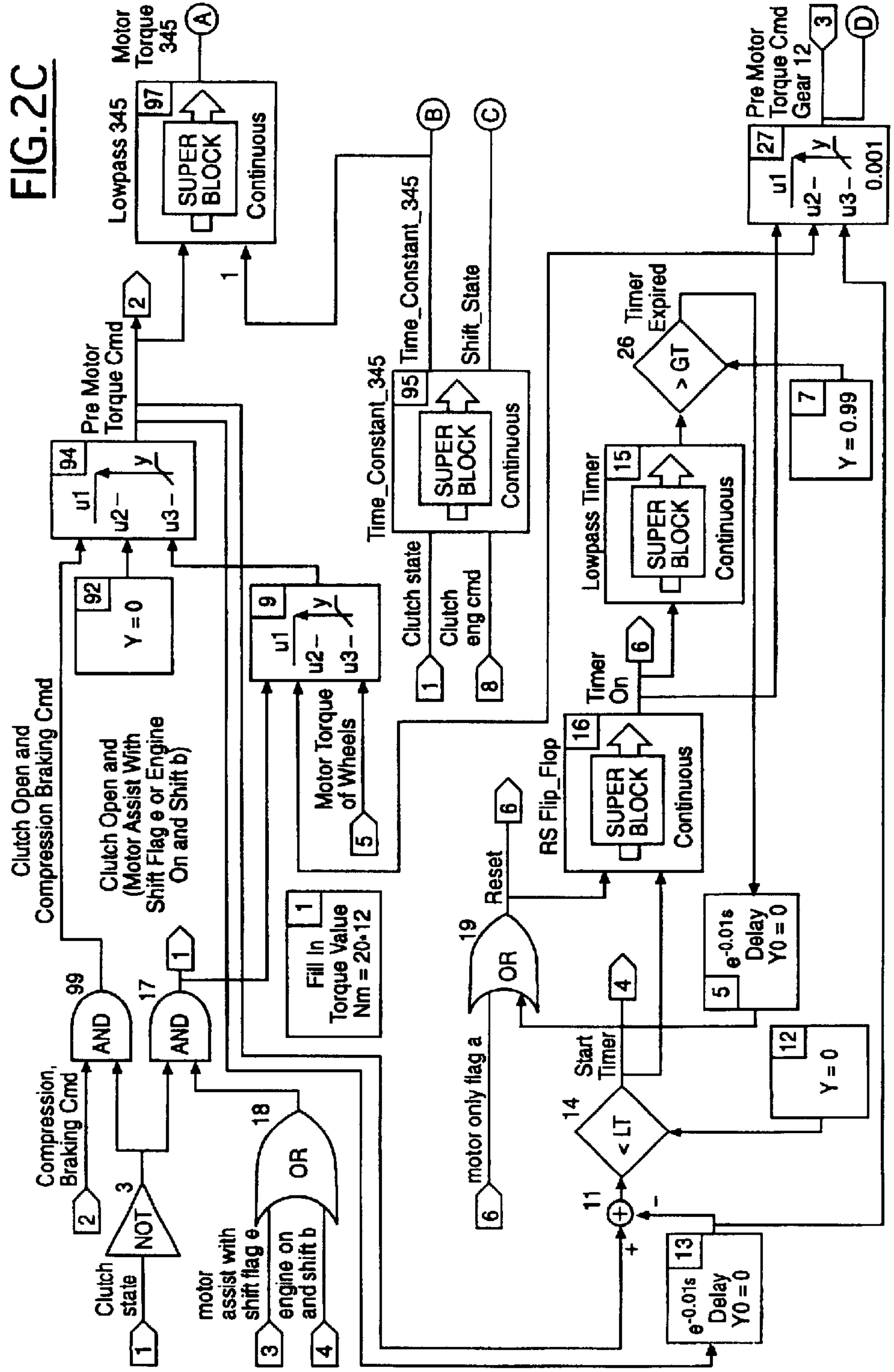
FIG. 2C
Lowpass 345
97
SUPER BLOCK
Continuous
Motor Torque 345
A
1
B
C
Time_Constant_345
Shift_State
95
Time_Constant_345
SUPER BLOCK
Continuous
Clutch state
1
Clutch eng cmd
8
Pre Motor Torque Cmd
2
94
u1
u2
u3
y
92
Y = 0
9
u1
u2
u3
y
Motor Torque of Wheels
5
Clutch Open and Compression Braking Cmd
Clutch Open and (Motor Assist With Shift Flag e or Engine On and Shift b)
99
AND
17
AND
1
1
Fill In Torque Value Nm = 20·12
Compression, Braking Cmd
2
3
NOT
Clutch state
1
motor assist with shift flag e
3
engine on and shift b
4
18
OR
motor only flag a
6
19
OR
Reset
6
RS Flip_Flop
16
SUPER BLOCK
Continuous
Timer On
6
Lowpass Timer
15
SUPER BLOCK
Continuous
26
Timer Expired
> GT
7
Y = 0.99
27
u1
u2
u3
y
0.001
Pre Motor Torque Cmd Gear 12
3
D
5
e^-0.01s Delay Y0 = 0
12
Y = 0
14
< LT
Start Timer
4
11
+
-
13
e^-0.01s Delay Y0 = 0

Vehicle Speed (MPH)
70
60
50
40
30
20
10
0
0
10
20
30
TIME (SEC)

Throttle Angle (Deg)
100
80
60
40
20
0
0
10
20
30
TIME (SEC)

Engine Speed (RPM)
6000
5000
4000
3000
2000
1000
0
0
10
20
30
TIME (SEC)

Gear Number
5
4
3
2
1
0
10
20
30
TIME (SEC)

Halfshaft Torque Simulated (Nm)
600
500
400
300
200
100
0
0
10
20
30
TIME (SEC)

HYBRID ELECTRIC VEHICLE WITH MOTOR TORQUE FILL IN

BACKGROUND OF INVENTION

The present invention relates to a hybrid electric vehicle having an electric motor and an internal combustion engine and a method of control thereof. More particularly, the present invention provides a post-transmission, parallel hybrid electric vehicle wherein the motor provides torque fill directly to a drive axle via a differential when the engine is torsionally isolated from the differential due to a shift in the transmission.

The primary objective of the automobile industry is the development of safe vehicles for personal mobility that meet or exceed customer expectations for performance, including acceleration, braking, maneuverability, and comfort, while minimizing the impact on the environment.

The automobile is an integration of many complex non-linear systems, one of which is the powertrain system. The vehicle powertrain is a composition of electrical, mechanical, chemical, and thermodynamic devices connected as a nonlinear dynamic integrated system, with the primary objective of providing the power source for transportation. A conventional vehicle powertrain consists of an internal combustion engine (ICE), transmission, and driveline including a differential and axle system with drive wheels. An electric vehicle (EV) powertrain consists of an electric motor, gearing, and driveline including a differential and axle system with drive wheels. Also included are accessories and peripherals connected to the powerplant such as power steering, power brakes, and air conditioning.

Combining an EV powertrain system with conventional powertrain components results in a hybrid electric vehicle (HEV). A parallel hybrid electric vehicle (PHEV) configuration consists of an electric motor powertrain system and a conventional powertrain system that can provide tractive power to the drive wheels simultaneously. A PHEV can be synthesized using a conventional spark-ignited or combustion-ignited ICE powerplant/alternator combination, combined with a transmission/differential and with an ac-induction traction motor attached after the differential.

The HEV is motivated by the limitations of batteries contained in the EV, for providing extended range and performance. Including an auxiliary powerplant, such as an ICE/alternator combination, along with a conventional EV powertrain, can potentially extend the vehicle performance envelope and fuel economy, while mitigating the effect of emissions over a conventional ICE powertrain.

Most conventional ICE-powered vehicles that have an automatic transmission have a planetary gear-type transmission. In the planetary gear-type transmission, most of the gears revolve about a common axis. At the front end of the transmission is a torque converter. The torque converter provides a fluid turbine torque transfer arrangement providing a smooth gear shift. However, the torque converter on the conventional automatic transmission induces parasitic losses in the driveline.

Most manual transmissions are layshaft-type transmissions. The layshaft transmission has a dry clutch between itself and the engine. Selectively clutched gears on the layshaft are manually selected for engagement with the output shaft to provide the desired gear ratio.

In the early attempts approximately one-half century ago to provide for automatic transmissions, efforts were made to use layshaft transmissions wherein an electric motor would shift the transmission in lieu of operator input. Such transmissions were typically referred to as automated manual transmissions.

HEVs have an inherent cost disadvantage over internal combustion powered engines or EV powered engines in that they require the capital cost of two power plants. It is highly desirable that maximum efficiencies in fuel economy be obtained to make such vehicles more receptive to the buying public.

Accordingly, many HEV designs have an automated manual transmission. During shifting of an HEV automated shift manual transmission, when the engine or engine and motor in combination powers the vehicle, torque to the drive wheels is disrupted or reduced. This torque disruption can severely affect driveability, degrading the perceived quality of the vehicle. The affect on driveability is related to the change in acceleration that occurs when torque is removed or reduced from the drive wheels due to engine clutch engagement and disengagement. Both torque magnitude and frequency changes can be felt by the driver, thus affecting driveability.

Therefore it is desirable to allow the motor to add torque during transmission gear changes in a manner that is imperceptible to the vehicle operator. These and other issues related to hybrid electric vehicles are the subjects of U.S. Pat. Nos. 4,533,011; 5,337,848; 5,669,842; 5,755,302; and 6,019,698.

Although some of the aforementioned patents reveal HEVs wherein the electric motor can contribute torque to the transmission when an engine clutch is disengaged during a transmission shift, these patents require that the motor contribute torque to a drive axle of the vehicle via the transmission. Accordingly, the motor must not only contribute torque to the drive axle but also contribute torque to portions of the transmission. It is preferable that the motor be directly coupled to the drive axle or be directly coupled to the drive axle by its own clutch so that there is minimal loss of torque from the motor to the drive axle.

Minimizing torque loss from the motor to the drive axle can result in an advantage of a smaller motor providing enhanced torque output performance characteristics to the vehicle. The enhanced torque output provides greater vehicle acceleration.

It is desirable to provide a post-transmission, PHEV arrangement and method of control thereof wherein a manual automated transmission with a dry clutch can be utilized to maximize fuel economy, while at the same time being operated in a manner to minimize vibration and reaction during gear changes of the transmission.

It is also desirable to provide a PHEV as described above and a method of operation thereof that can be quickly modified for utilization with a selection of manual automated transmissions having different synchronizing and control schemes.

SUMMARY OF INVENTION

The vehicle driveline of the present invention accepts ICE torque and electric motor torque (in a regenerative or motoring mode), and delivers torque to the wheels through a differential and halfshafts. Motor torque is delivered via a transaxle and differential to a halfshaft. Motor torque is summed with engine torque at the differential. The engine is connected directly to the differential through an engine clutch, transmission and final drive (a propshaft if applicable), as in a conventional powertrain.

The driveline includes an automated manual layshaft transmission that lies between the engine clutch and the differential. A controller commands the motor to provide torque to the drive wheels during transmission shifting in a seamless manner, improving driveability.

The control system provides digital filtering that is activated during engine clutch disengagement and engagement. Different filters and control logic are used for clutch disengagement from full engagement to the touchpoint, disengagement from the touchpoint to full disengagement, engagement from full disengagement to the touchpoint and engagement from the touchpoint to full engagement. Different filters and control logic are used depending upon the selected transmission gear and the state of engine clutch engagement and disengagement. In lower gear, more torque is transmitted through the driveline so longer filter time constants are utilized to maintain good driver feel.

It is an advantage of the present invention to free a post-transmission HEV to have the enhanced fuel economy afforded by automated manual transmissions by providing torque transfer to the drive axle from the motor in a more continuous smooth fashion.

Other advantages of the present invention will become more apparent to those skilled in the art from a review of the accompanying drawings and detailed description.

BRIEF DESCRIPTION OF DRAWINGS

FIGS. 2A and 2B are digital logic diagrams of a control of torque fill in from the motor to the differential shown in FIG. 1 during transmission shifting.

FIGS. 2C and 2D are logic diagrams of an analog version of the present invention.

FIGS. 5A through 5I are graphic illustrations of the same values described in FIGS. 4A through 4I without torque fill in.

DETAILED DESCRIPTION

Figure 1:
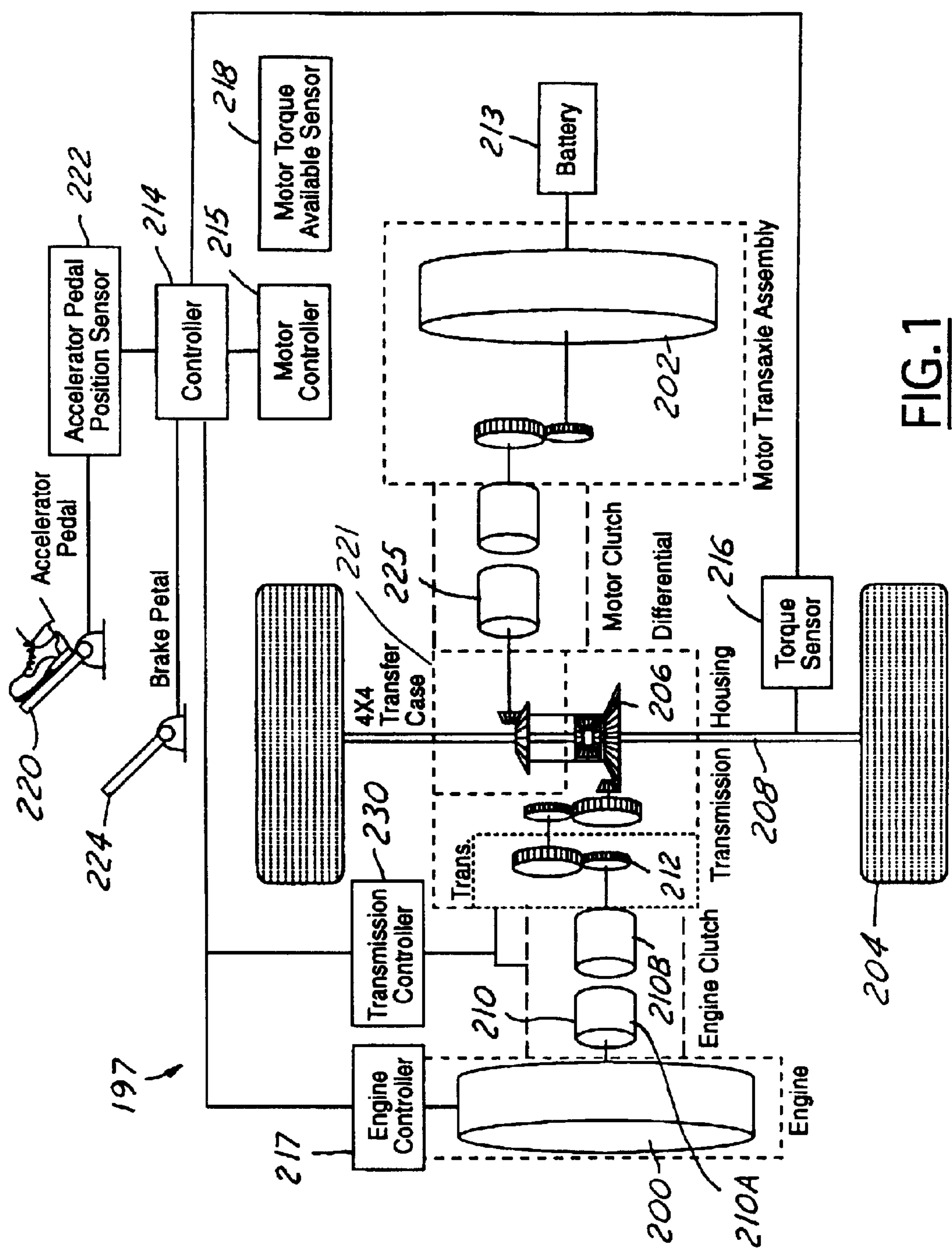
FIG. 1 is a schematic view of a post-transmission, PHEV driveline according to the present invention having an engine joined to a layshaft automated transmission by an engine clutch, with the transmission being torsionally connected to a differential and a motor being torsionally connected to the differential via a motor clutch.

Referring to the post-transmission, PHEV configuration of FIG. 1, a powertrain driveline 197 is powered by an internal combustion engine 200 and a motor 202. Included in the powertrain driveline 197 is a layshaft automated manual transmission 212. The transmission 212 is between an engine clutch 210 and a differential 206 (any applicable propshafts are not shown). The motor 202 can power the drive wheels 204 (positive torque) to move the vehicle.

The motor 202 is also a generator that can brake the drive wheels 204 with electric regenerative braking to slow the vehicle down (negative torque). The motor 202 is connected with the drive wheels 204 via a motor clutch 225, the differential 206 and a 4×4 transfer case 211 (for a four-wheel drive vehicle). The torque contributed by the motor 202 is not transmitted to the drive wheels 204 through the transmission 212. The torque path of the engine 200 is similar or identical to that for a conventional vehicle with a manual transmission. The engine 200 is connected to the differential 206 through the engine clutch 210, transmission 212 and the differential 206.

A PHEV coordinated controller 214 provides motoring and regenerative commands to a motor controller 215 for corresponding positive and negative motor 202 torque, and throttle blade commands to an engine controller 217. These commands may be based on the battery state of charge (SOC), motor speed versus torque limits, motor 202 torque current, motor 202 field current, transmission 212 gear, accelerator pedal 220 position, engine clutch 210 state, motor clutch 224 state, engine 200 speed, average power at the drive wheels 204, shift status, estimated engine 200 torque, estimated motor 202 torque available, brake pressure, and estimated engine 200 torque available.

In addition, the controller 214 commands engine and motor clutch 210, 224 control during braking, or hybrid operation. The controller 214 also distributes braking commands to a regenerative brake system associated with the motor 202 and a friction brake system (not shown).

The driveline 197 may be partitioned to operate in an engine 200 only mode, a motor 202 only mode, or a two traction device mode (hybrid mode). Hybrid mode operation consists of motor 202 only operation, engine 200 operation, motor 202 torque application during shifting, motor 202 assist during power boost, and regenerative braking. The motor 202 can provide torque during shifting so that torque disruption to the driveline 197 is eliminated. The driveline 197 will provide negative torque to the motor 202 during braking for energy recovery to a battery 213. During periods of low battery 213 SOC operation, the engine 200 may be loaded with the alternator (motor 202 or another alternator/generator not shown) to increase the battery 213 SOC.

The vehicle driveline 197 has an optional torque sensor 216. The torque sensor 216 may be a single torque sensor or a plurality of torque sensors which may sense the torque at the halfshafts 208 and by computation determine the torque of engine 200 or motor 202 or it may be a combination of sensors appropriately placed. The controller 214 is also connected with a motor speed sensor which is used to estimate the amount of maximum motor torque available which is typically highly dependent upon battery 213 SOC. The function of sensor 218 is typically provided by the aforementioned speed sensor.

To receive operator drive commands for torque there is an accelerator pedal 220 that is operatively associated with an accelerator pedal position sensor 222. The accelerator pedal position sensor 222 is also communicative with the controller 214. The motor 202 also has between itself and the differential 206 a clutch 225, which for the purposes of this invention can be considered essentially in a closed or engaged position. The vehicle also has a brake pedal 224 which communicates with the controller 214.

The vehicle launches in motor 202 only mode for optimal driveability, emissions, and fuel economy. When the average power at the vehicle drive wheels 204 reaches a level where operation of the engine 200 is beneficial, the motor 202 is no longer operated alone.

During shifting of the automated shift manual transmission 212, when the engine 200 or engine 200 and motor 202 in combination powers the vehicle, torque to the drive wheels 204 is disrupted or reduced. This torque disruption can severely affect driveability, degrading the perceived quality of the vehicle. The affect on driveability is related to the change in acceleration that occurs when torque is removed or reduced from the drive wheels due to engine clutch 210 engagement and disengagement. Both torque magnitude and frequency changes can be felt by the driver, thus affecting driveability. The present invention motor 202 provides torque during shifting so that torque disruption to the powertrain driveline 197 is eliminated.

Also, the engine 200 can be started during a shift, and the engine clutch 210 can be engaged once the engine is cranked. While the engine clutch 210 is engaging the motor torque 202 is reduced in a manner seamless to the vehicle occupants.

The engine clutch 210 will be commanded to disengage if an upshift or downshift is requested, braking is commanded, engine 200 speed falls below idle, or no engage engine clutch command is present and the engine clutch 210 is not presently engaged. In the automated layshaft transmission control, engine clutch 210 engagement will be commanded when the engine 200 speed is sufficient, the brakes are not commanded (the engine clutch 210 will be disengaged for electric regenerative braking), no upshift and no downshift requests exist, the transmission 212 is in gear, and no disengage engine clutch command is present.

The engine clutch 210 uses friction to transmit torque to the transmission 212. The clutch plate friction allows the plates 210A, 210B to slide before becoming fully engaged to prevent jerking. The conditions for engine clutch slipping are a function of engine speed, vehicle speed, and halfshaft resonance. When the engine 200 speed is much greater than the vehicle speed, then slipping is necessary to allow the engine clutch friction to load the engine 200, thus reducing the engine 200 speed to the vehicle speed level so that smooth engagement can take place. When the engine 200 speed is much slower than the engine clutch 210 speed, engine clutch 210 slippage allows engine speed 200 to be increased, via the throttle, while exposing the engine 200 to a very small load, thus avoiding engine 200 stall.

During engagement, essential negative damping causing "clutch shudder" as well as halfshaft resonance may be present in a magnitude that can be felt by the driver in which case the modulation.

As mentioned previously, the transmission 212 is an automated layshaft transmission. The shift strategy of the transmission is not part of the present invention but is determined by the driveline designer. The present invention improves the "feel" of the transmission 212 by contributing torque to the differential 206 when shift changes are made so as to minimize clutch shudder.

The motor 202 adds torque to the driveline 197 directly and does not have to act through the clutch plate 210B. During the shifting operation the various gears of the transmission will be in various states of engagement and disengagement, therefore, torque contribution from the motor 202 to the differential 206 will not be torsionally communicated to all of the gears of the layshaft transmission 212.

Figure 7A:
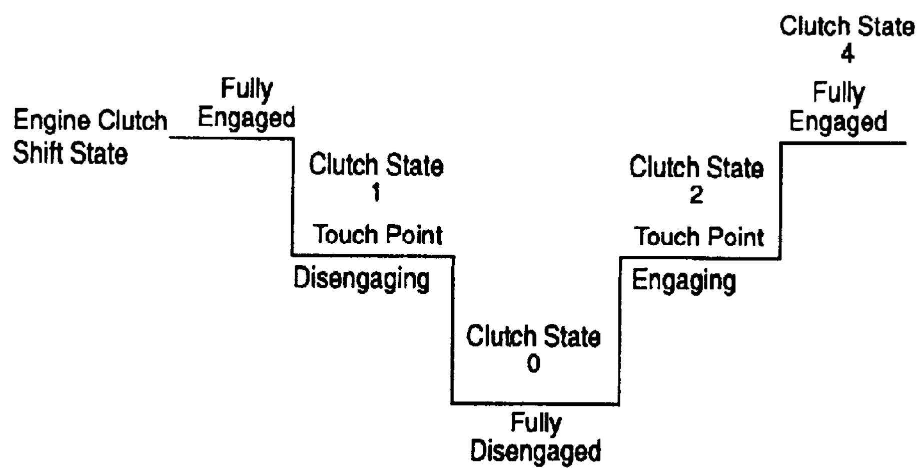
FIGS. 7A and 7B are graphic illustrations of the change of time constants relating to the engine clutch shift state.
Figure 7B:
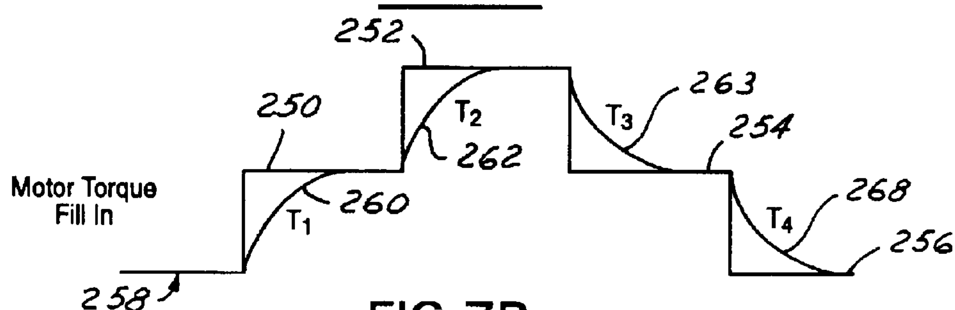
Figure 8:
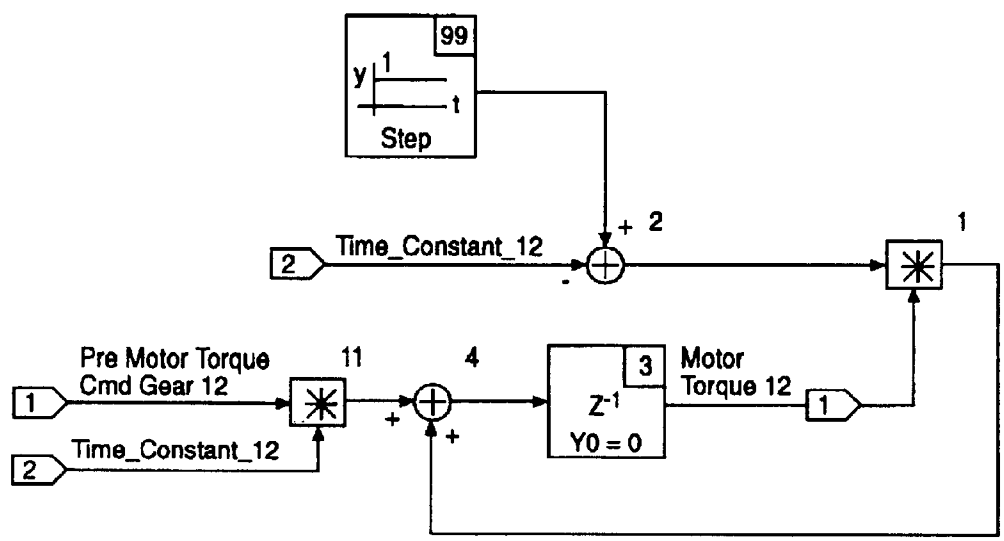
FIG. 8 is an enlargement of super block 97 of FIG. 2B.

Referring additionally to FIGS. 7A and 7B, the apparatus and method of the present invention not only provide torque contribution by the motor 202 when the transmission 212 is shifting but also provide the torque contribution in a filtered or time delayed manner rather than in a step function. In most instances, the time delay will be that of the first order. Level 258 is an initial level of motor torque during a gear shift. Level 258 in most instances will be zero but in certain instances may be a higher value.

In the initial changes of operation of the transmission, the clutch 210 will be fully engaged. Accordingly, torsion will be transferred from the internal combustion engine 200 via the engine clutch 210 through the transmission 212 to the differential 206. Upon predefined conditions, the controller 230 will signal for a change in gear for transmission 212. The gear changing operation will also require that the clutch 210 go from a fully engaged position wherein there is no slippage between the clutch plates 210A, 210B to a touchpoint engagement wherein there is virtually total slippage between the clutch plates 210A, 210B, however, there is still contact between the clutch plates. Touchpoint engagement will be described later in the application as clutch state 1.

To prevent the aforementioned clutch shudder and to contribute to the smoothness of the gear change for the transmission 212, the motor 202 will not contribute torque to the driveline 197. From the fully engaged position to touchpoint engagement, torsion by the motor will be added in an increasing manner to a level 250 (FIG. 7B). To prevent clutch shudder, the increase in motor torque contribution from level 258 to level 250 will be about line 260 under time constant 1.

From touchpoint engagement, the clutch plates 210A, 210B further open to the point where they are fully disengaged to what is herein described as clutch state zero. Torsion will be added by the motor 202 in an increasing manner from level 250 to level 252 under a time constant T2 along line 262.

From a clutch state of full disengagement or as herein referred to, to fully disengage, the layshaft transmission 212 will have accomplished all if note most of its physical motion required to effect the gear shift. The transmission controller 230 will now signal the clutch plates 210A, 210B to move together relative to one another.

It is obvious to those knowledgeable in the art that the movement of the clutch plates 210A, 210B is relative and one of such clutch plates may be transitionally fixed depending upon the clutch design.

From the fully disengaged position back to a touchpoint engagement, the motor will contribute torque to the driveline 197 in a decreasing manner from level 252 to a torque level 254. Again, to avoid a virtual step function type input, the decreasing torque contribution by the motor 202 will be made under the time constant 263, hereinafter referred to as the third time constant.

From a point of touchpoint engagement noted as clutch state 2, to a clutch state of being fully engaged noted as clutch state 4 (FIG. 7A), torque from the motor 202 will be added to the driveline 197 in a diminishing manner from torque level 254 to torque level 256 under time constant 4 noted along line 268. In most instances, level 256 will be equal to level 258.

From the explanation given above, it is noted that the time constants vary in relation to the clutch state. However, in certain applications it can sometimes be desirable for the disengaging clutch states to be constant causing clutch state T1 and T2 to be equal.

In like manner, for certain applications, time constants T3 and T4 can be made equal to one another. Depending upon the characteristics of the vehicle driveline, typically time constants will increase (causing the clutch to engage in a faster manner) for higher gear ratios wherein less torsion is transferred between the clutch plates 210A, 210B.

In a further aspect of the present invention, a rotational property of the driveline 197, preferably one directly related to one of the halfshafts 208 is monitored. One of various analyzing techniques determining root mean square of oscillations will be utilized to monitor changes in oscillations in the halfshafts 208.

When the measured property of oscillations reaches an excessive level, a feedback system via logic and controller 214 and/or motor controller 215 will modify the time constants. Clutch wear in clutch plates 210A, 210B can cause time constants, especially time constant T4, to be reduced. Also, jerkiness, on many occasions will cause time constant T1 to be reduced in order to modify oscillations.

As mentioned previously, in this PHEV configuration initial launch of the vehicle is with motor 202 only. The engine 200 is only cranked to engage during the gear change from first to second gear when the engine clutch 210 is fully disengaged. Contribution of torque from the engine will only incur from clutch shift state zero to clutch shift state 4. Accordingly, in the first gear shift, only time constants T3 and T4 become relevant since the motor 202 was already providing torque during the clutch shift states 1 and zero.

The remaining portions of this application give further details of the logic and circuitry utilized in applying the present invention.

Figure 2B:
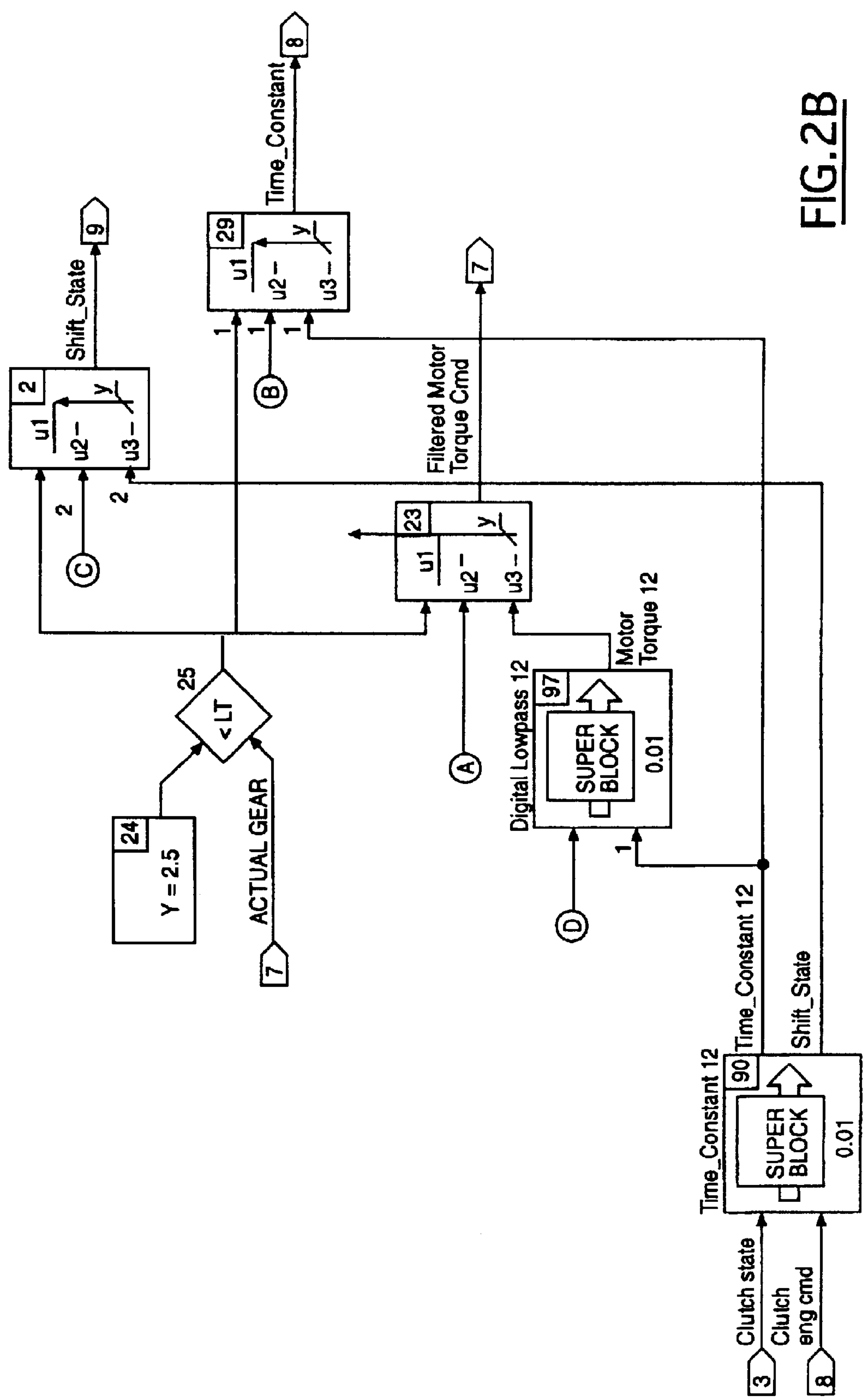
Figure 2D:
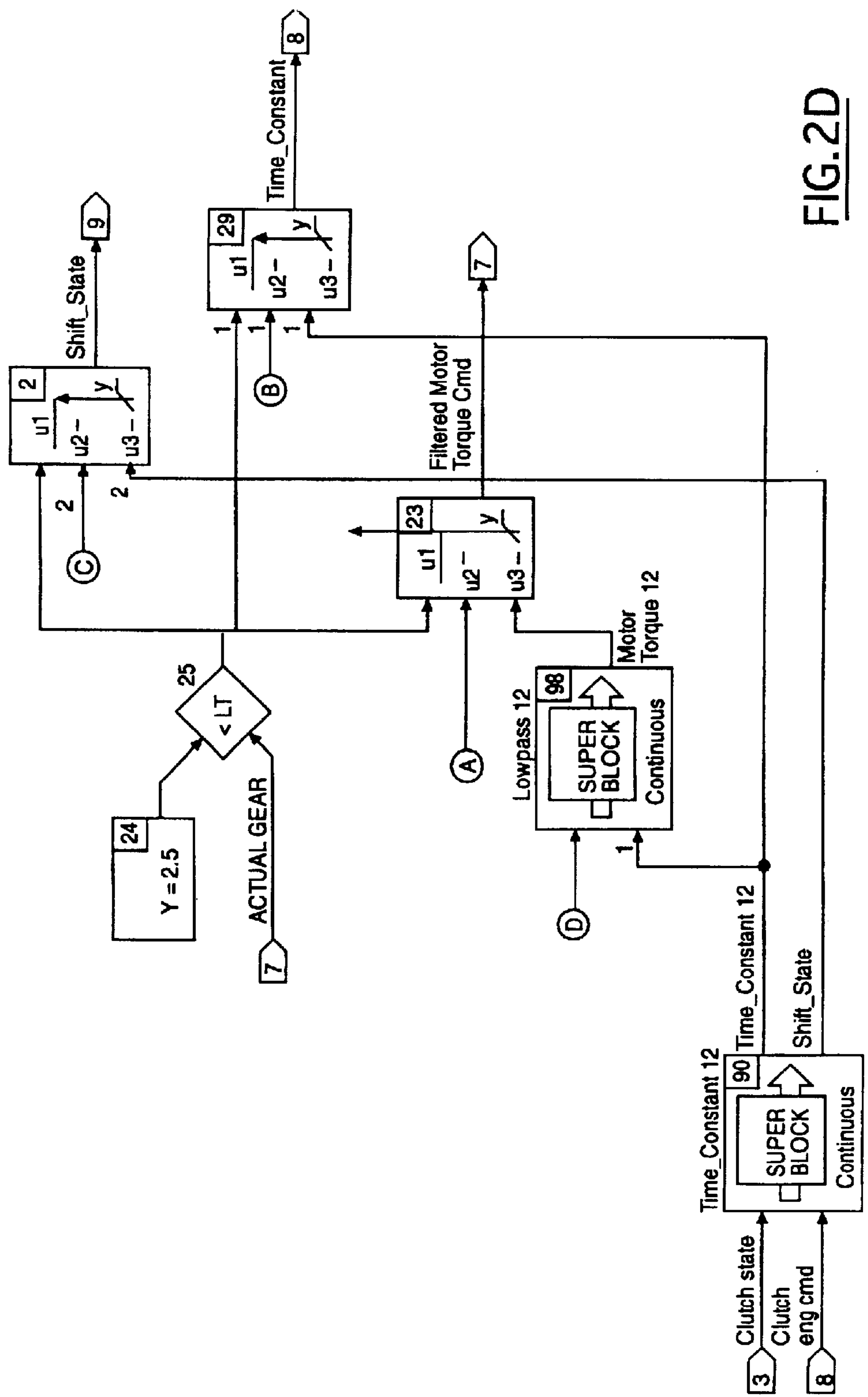
Figure 3:
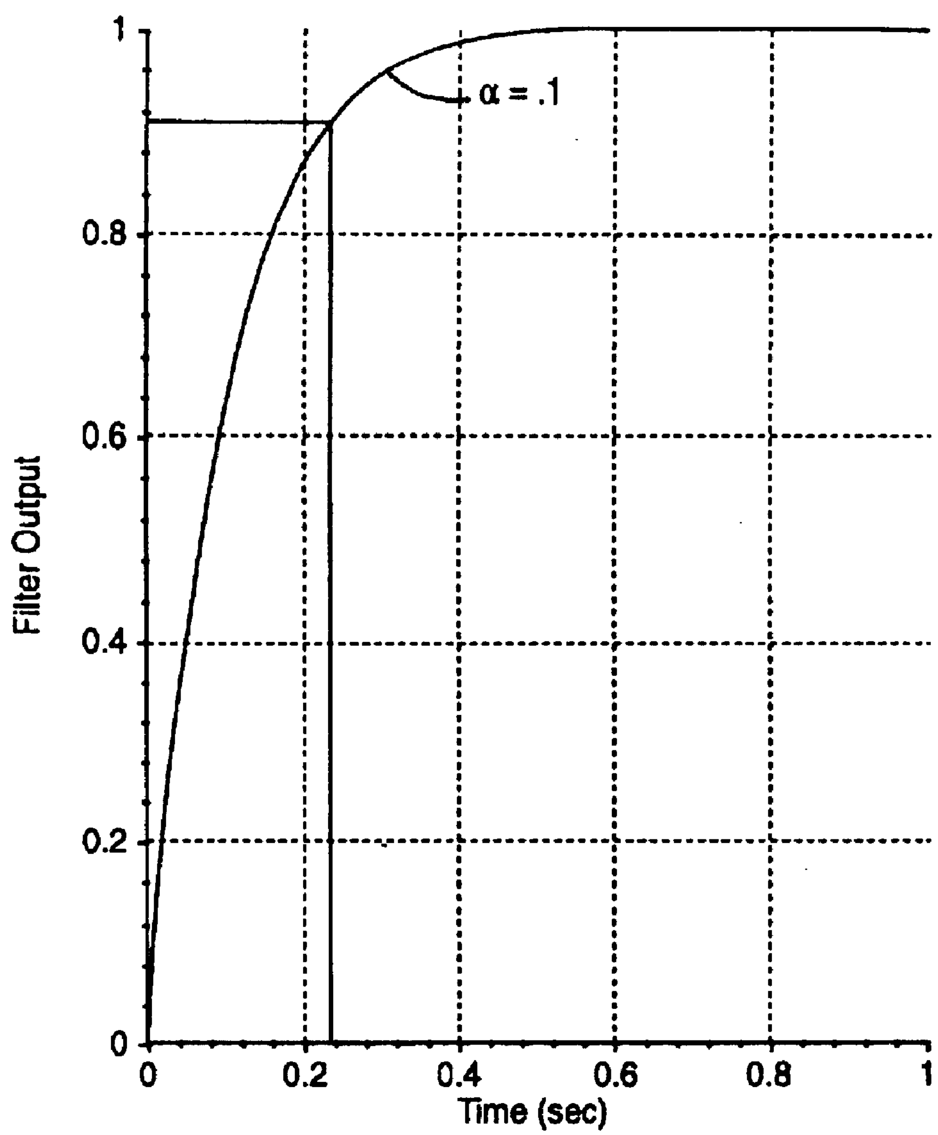
FIG. 3 is a graphic illustration of a filtered torsional input provided by the motor shown in FIG. 1.

FIGS. 2A and 2B are block diagram depictions of the invention in its digital version (FIGS. 2C and 2D are the analog version). FIGS. 2A and 2B were used to generate autocode (C code), which ran in a prototype vehicle. FIG. 3 explains operation of a digital lowpass timer which will be explained later. FIGS. 4A through 4I show simulation results with torque fill during shifts; FIGS. 5A through 5I show the same simulation without torque fill of the present invention. FIG. 6 shows the vehicle simulation and vehicle data of the torque fill in algorithm, working in a prototype vehicle.

The inputs to the control system are:clutch state(0=disengaged; 1=engaged) clutch eng cmd(0=disengaged; 1=engaged)compression braking cmd(0=the brake pedal or accelerator pedal or both are depressed; 1=no pedals depressed) motor assist with shift flag e(0=the motor is not assisting the engine prior to a shift event; 1=the motor is assisting the engine prior to a shift event)engine on and shift b(0=the engine is not operating by itself prior to a shift event; 1=the engine is operating by itself prior to a shift event)motor torque cmd at wheels(a value that ranges within the motor torque speed curve of the envelope reflected at the wheels) motor only flag a(0=the motor is not operating by itself; 1=the motor is operating by itself)actual gear (1–5, N, R).

The output of the dynamic control and logic is filtered motor torque cmd reflected at the wheels (labeled 7 in FIG. 2B).

If the driver is not commanding torque by depressing the accelerator or brake pedals, and the engine clutch is disengaged then pre motor torque cmd is zero. Since the driver has no expectation of torque, when the pedals are not depressed, zero torque is commanded. Else, if the engine clutch is open and the vehicle is shifting, either with or without motor assist, fill in torque value is requested. Otherwise, pre motor torque cmd is the value calculated by the motor torque cmd at wheels strategy, which is not part of this invention.

The pre motor torque cmd is filtered with a variable time constant, digital or analog lowpass filter. If the engine clutch is engaged the filter time constant is different than if the engine clutch is disengaged. If the vehicle is in a high gear, where not as much torque is transmitted through the driveline, a different filter value is used than for lower gears. These time constants are varied dependent on vehicle dynamics of each type of vehicle and vehicle gear ratios.

In the analog version of the present invention, the Laplace transform of the lowpass filter is of the form:

$$\frac{Y(s)}{U(s)} = \frac{\alpha}{s+\alpha}$$

where Y(s) is the Laplace transform of the motor torque for transitions from third gear to fourth or fourth gear to fifth (345) or motor torque for transitions from first gear to second gear (12), U(s) is the Laplace transform of the pre motor torque cmd or pre motor torque cmd gear 12, and α is the time constant which is varied by the algorithm according to various conditions described below.

In a digital version of the present invention, the following first-order lowpass filter is used in all cases; however, the time constant is changed depending on conditions to be described:

$$y(k)=\alpha u(k)+(1-\alpha)y(k-1)$$

where u(k) is the original, pre motor torque cmd at time k or pre motor torque cmd gear 12 (depending on the actual gear)

and y(k) is the motor torque 345 or motor torque 12 at time k, which is actually sent to the motor. Time constant α can take on a multiplicity of values between zero and one depending on various conditions. An increase in α brings forth a faster response.

Logic Description for Selection of Pre Motor Torque Cmd

Viewing FIGS. 2A and 2B the following is the description of digital implementation of the invention. The remainder of the description unless otherwise noted will refer to the digital version.

The value of pre motor torque cmd is determined based on the state of various logic signals as described below. This value is further processed by digital lowpass filters and additional logic before it becomes filtered motor torque cmd, which is the final positive motor torque command.

If the driver is not commanding torque, by neither depressing the accelerator nor brake pedals (compression braking cmd=1) AND the clutch is disengaged (clutch state=0), THEN do not command any fill in torque (pre motor torque cmd=0).

Else if the motor assist with shift flag e=1 OR engine on and shift b=1, AND the clutch is disengaged (clutch state=0) THEN pre motor torque cmd is the fill in torque value, ELSE pre motor torque cmd is the motor torque cmd at wheels.

Logic Description for Selection of Lowpass Filter Constants

This invention uses two distinct ways of choosing low-pass filter constants based on the current transmission gear. The particular gears mentioned refer to a prototype vehicle the strategy was implemented in, but they can be different for other vehicles. In third, fourth, or fifth gears, pre motor torque cmd is filtered by lowpass 345 to form motor torque 345. In first or second gears, pre motor torque cmd is modified by the fill in torque value and other conditions described below to form pre motor torque cmd gear 12, which is subsequently passed through lowpass 12 to form motor torque 12. Finally, in first or second gears, motor torque 12 is passed through the logical switch to become filtered motor torque cmd. In third, fourth, or fifth gears, motor torque 345 is passed through the logical switch to become filtered motor torque cmd.

The engine clutch 210 will be in one of four states, referred to as shift state, defined by clutch state and clutch_eng_cmd, summarized in the table below.

| clutch state | clutch_eng_cmd | shift state |
|---|---|---|
| 0 (Disengaged) | 0 (Disengage) | 0 (Disengaged) |
| 0 (Disengaged) | 1 (Engage) | 2 (Engaging) |
| 1 (Engaged) | 1 (Engage) | 4 (Engaged) |
| 1 (Engaged) | 0 (Disengage) | 1 (Disengaging) |

For third, fourth or fifth gears: the time constant used by lowpass 345 to filter pre motor torque cmd nm is given in the following table, implemented in super block time_constant_345:

| Shift State | Time_Constant_345 |
|---|---|
| 0 (Disengaged) | Disengaged_T2 Gear 345 |
| 2 (Engaging) | Engaging_T3 Gear 345 |
| 4 (Engaged) | Engaged_T4 Gear 345 |
| 1 (Disengaging) | Disengaging_T1 Gear 345 |

For first or second gears: the time constant used by lowpass 12 to filter pre motor torque cmd nm is given in the following table, implemented in super block time_constant_12:

| Shift State | Time_Constant_12 |
|---|---|
| 0 (Disengaged) | Disengaged_T2 Gear 12 |
| 2 (Engaging) | Engaging_T3 Gear 12 |
| 4 (Engaged) | Engaged_T4 Gear 12 |
| 1 (Disengaging) | Disengaging_T1 Gear 12 |

Logic Description for Calculation of Pre Motor Torque Cmd Gear 12

In the present PHEV configuration, the motor 202 is used to launch the vehicle in first gear. When certain conditions are met, the engine 200 will be used to propel the vehicle and the motor 202 is turned off. At this time the engine clutch 210 is engaged, connecting the engine 200 to the transmission 212. The transition from motor launch to engine only operation is performed during the shift from first to second gear to minimize torque disruption. Fill in torque value is applied by the motor 202 before it is turned completely off. The magnitude of fill in torque value is dependent on motor 202 and driveline 197 characteristics. Ideally, fill in torque value should be as large as possible without causing undesirable driveline oscillations.

An example of the electronic signaling utilized to accomplish the present invention is explained hereafter. In the shift from first to second gear, certain factors have been simplified. Since the vehicle starts off utilizing the motor, torque from the internal combustion engine does not flow to the powertrain until the engine clutch is engaged after the shift from first to second gear. Accordingly, torque fill in from the motor will essentially occur from the fully disengaged engine clutch position to the fully engaged engine clutch position.

In the explanation to follow, the time constants are further simplified by T3 and T4 being identical. In the subsequently explained shifts from second to third gear and third to fourth gear, motor torque fill in for torque levels 258 to 250 and 250 to 252 will also be required as well as motor torque fill-in values from level 252 to 254 and 254 to 256.

Figure 11A:
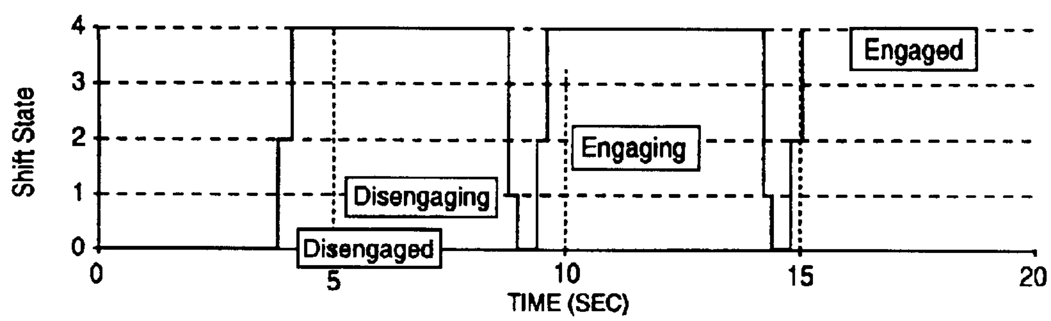
FIG. 11A is a graphic illustration of shift state of a vehicle utilizing the present invention.
Figure 11B:
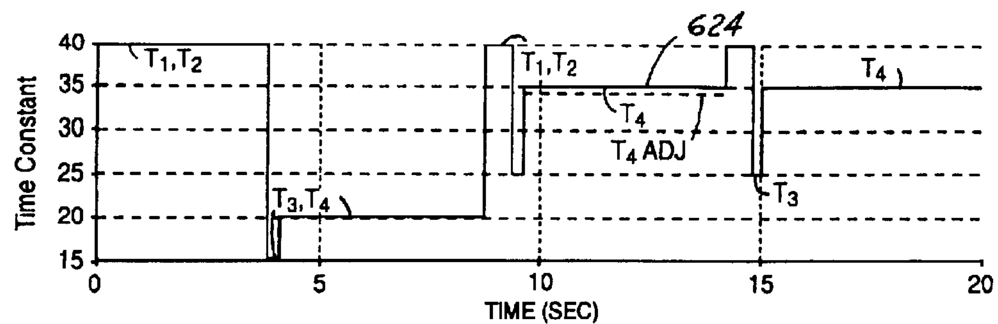
FIG. 11B is a graphic illustration of the time constant utilized in filtering torque input by the motor shown in FIG. 1.

FIGS. 11A, 11B are graphic illustrations of the present invention as shown for shifts from first to second gear, second to third gear, and third to fourth gear. When shifting from first to second gear, time constants T3 and T4 will be utilized. Torque fill in from the motor in a diminishing amount noted as item 602 (FIG. 11D) will be supplied to the driveline 197 under the time constant T3.

Figure 11C:
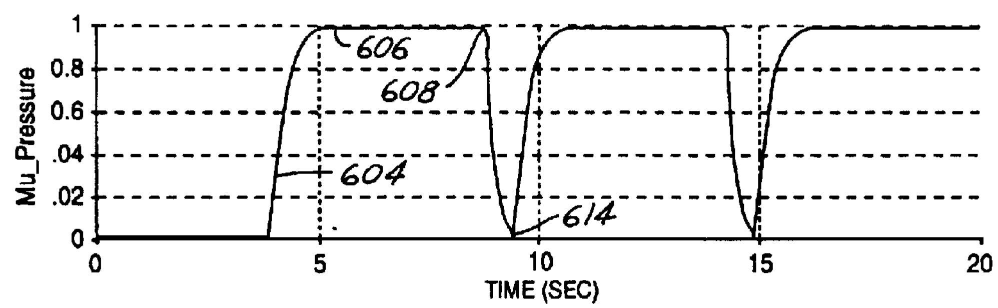
FIG. 11C is a graphic illustration of engagement pressure of the engine clutch.
Figure 11D:
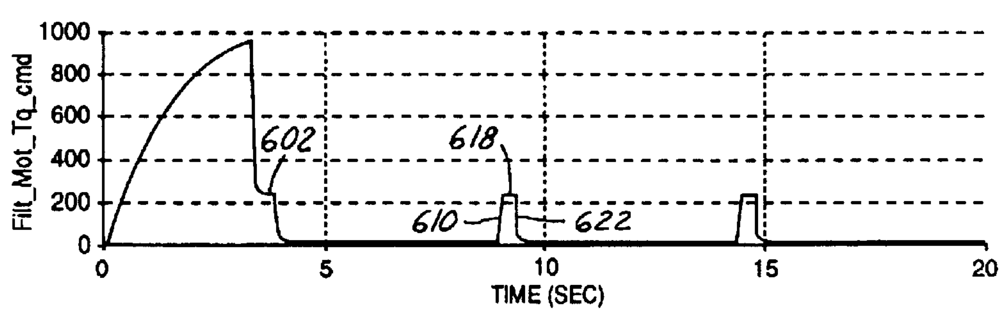
FIG. 11D is a graphic illustration of the torque value of the motor.

For the shift to third to fourth gears, the clutch 210 will initially open at 608 (FIG. 11C). Increasing torque from the motor 202 will be supplied to the powertrain differential 206 under time constant T1 610 (FIG. 11D).

When the clutch 210 is fully disengaged the clutch pressure 614 (FIG. 1C) is equal to 0. Torque from the motor 202 will be continually supplied to the differential 206 about time constant T3 which has an alpha of 25 (618 FIG. 11D). Torque will be continually supplied in a diminishing manner about a time constant T4 (622 FIG. 11D). T4 at 624 is at a level of 35 for alpha.

Figure 11E:
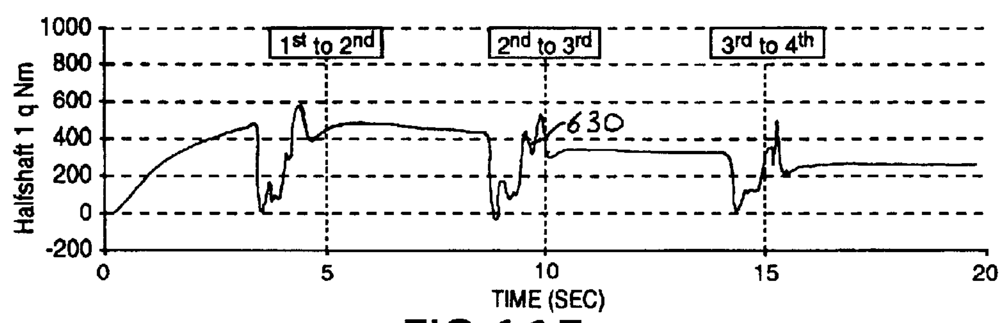
FIG. 11E is a graphic illustration of the torque of the halfshaft.
Figure 12:
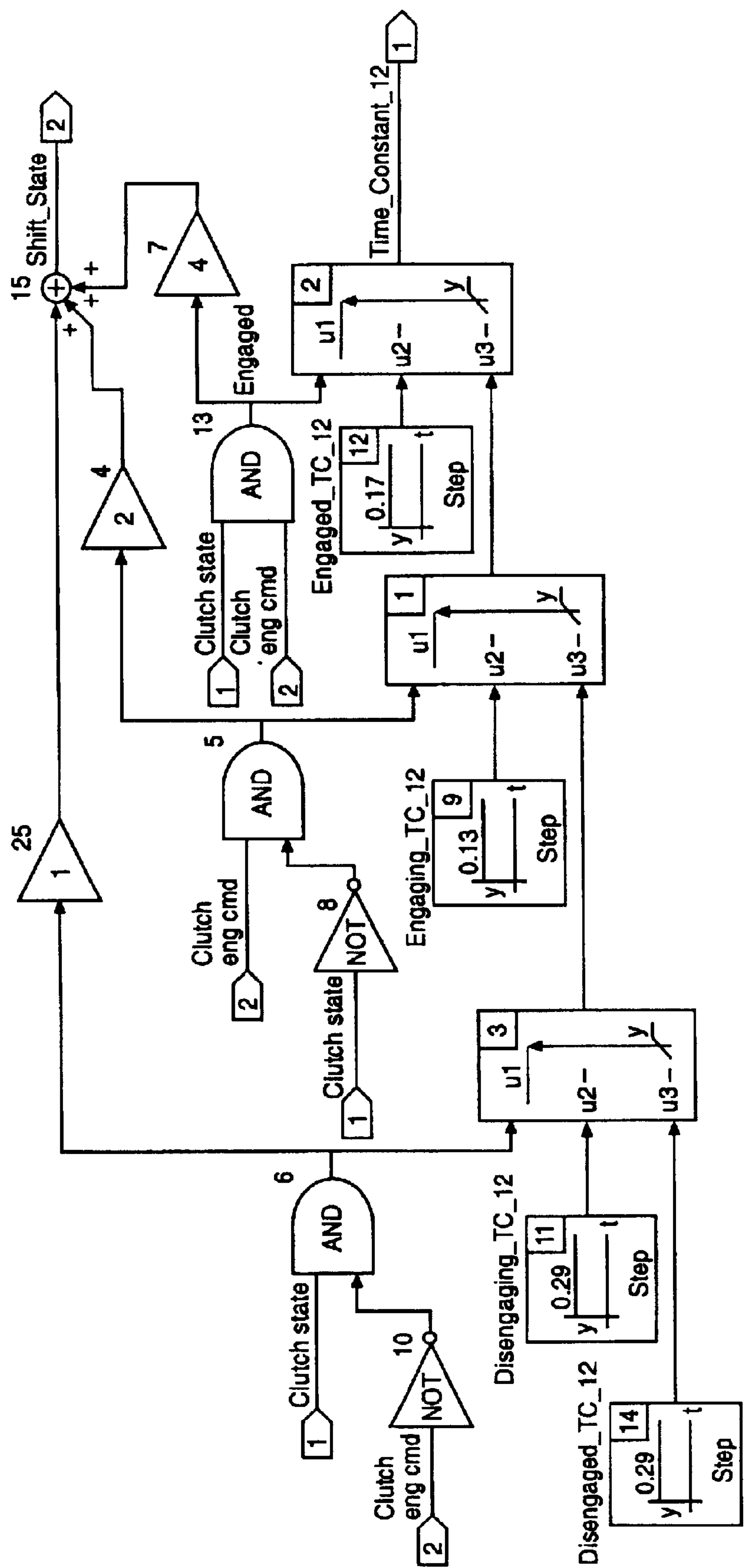
FIG. 12 is an enlargement of super block 90 of FIG. 2B.
Figure 13:
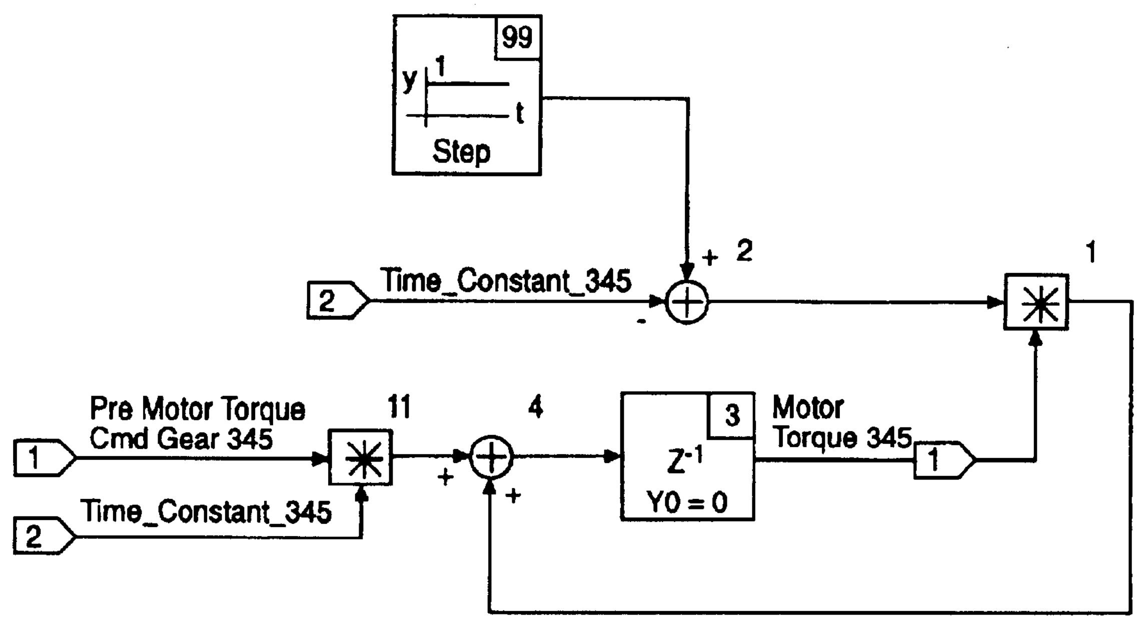
FIG. 13 is an enlargement of super block 93 of FIG. 2A.
Figure 14:
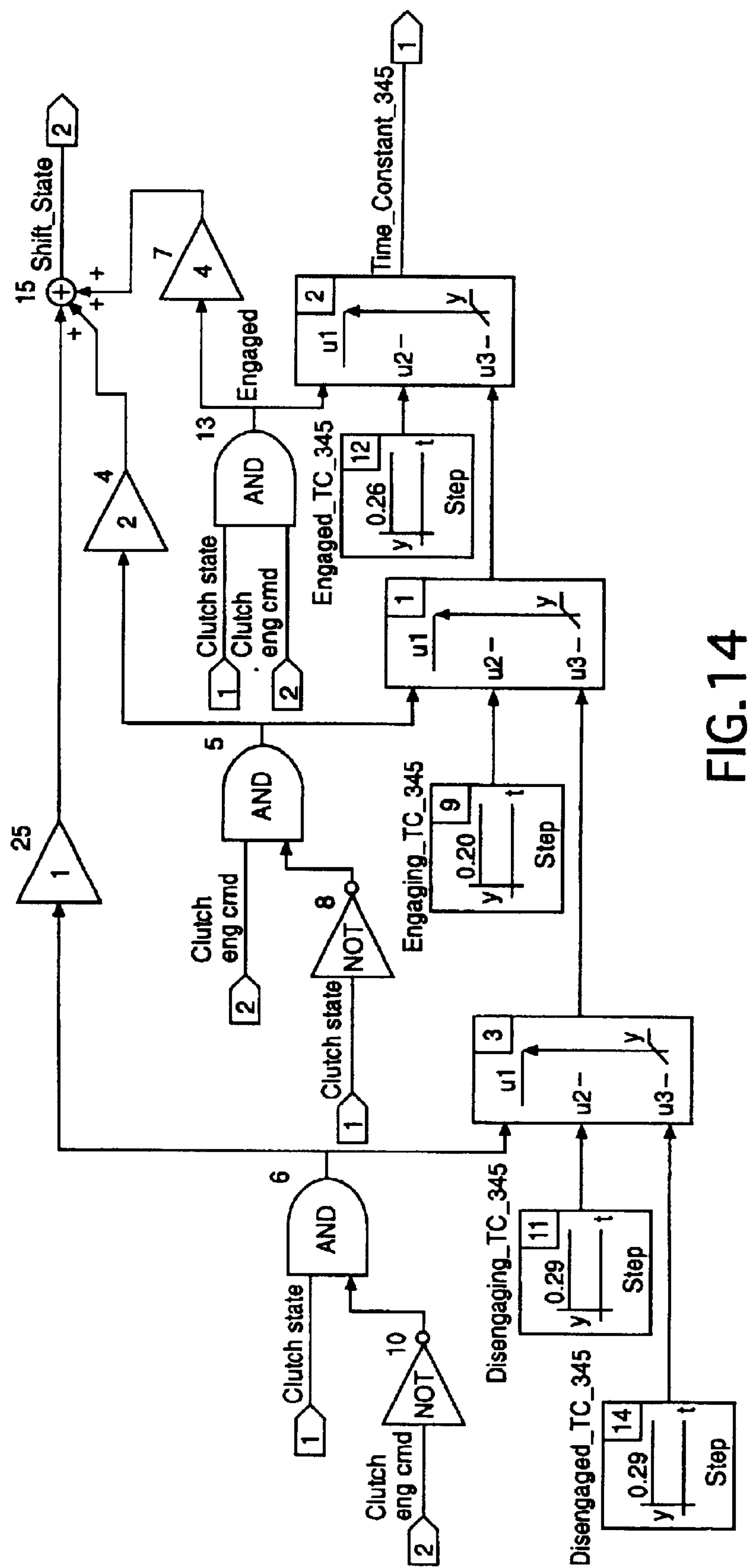
FIG. 14 is an enlargement of super block 95 of FIG. 2A.
Figure 15:
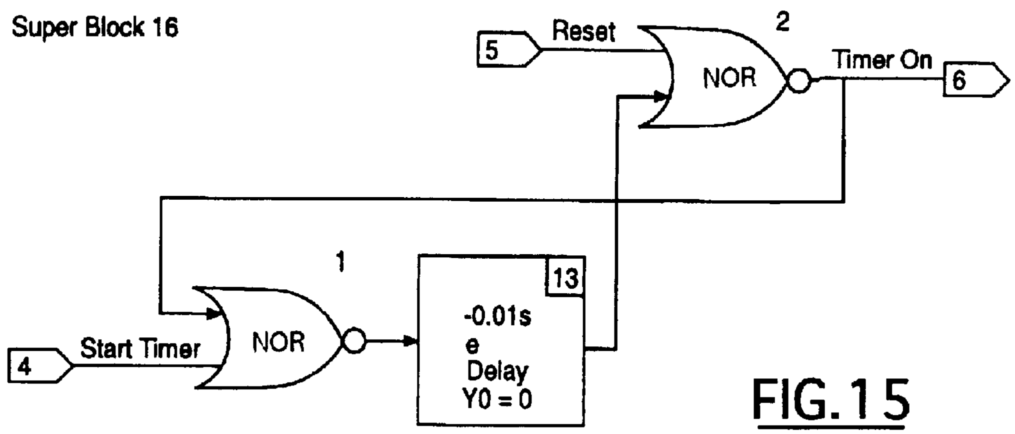
FIG. 15 is an enlargement of analog super block 16 of FIG. 2C.
Figure 16:
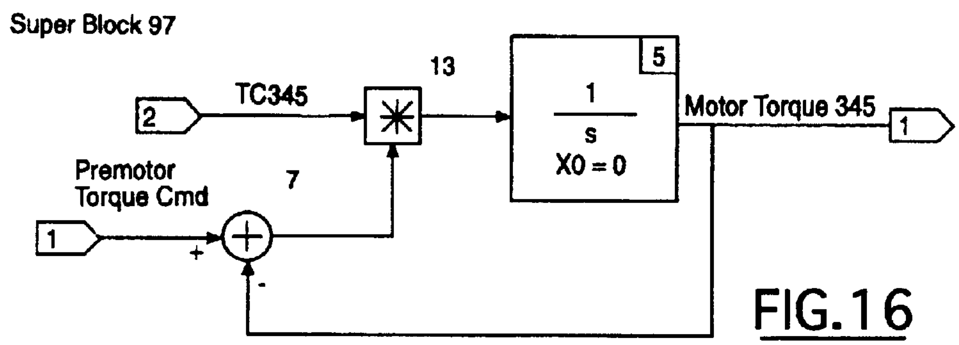
FIG. 16 is an enlargement of analog super block 97 of FIG. 2C.
Figure 17:
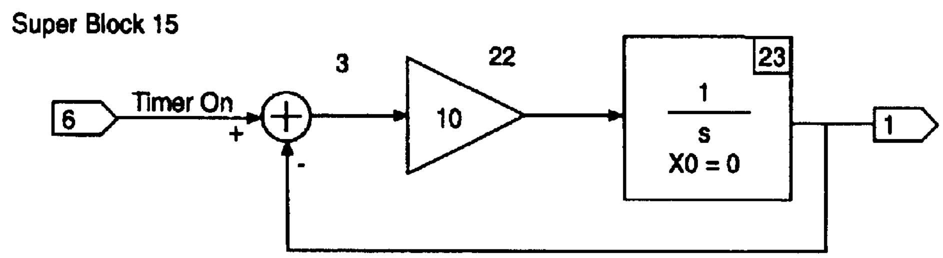
FIG. 17 is an enlargement of analog super block 15 of FIG. 2C.
Figure 18:
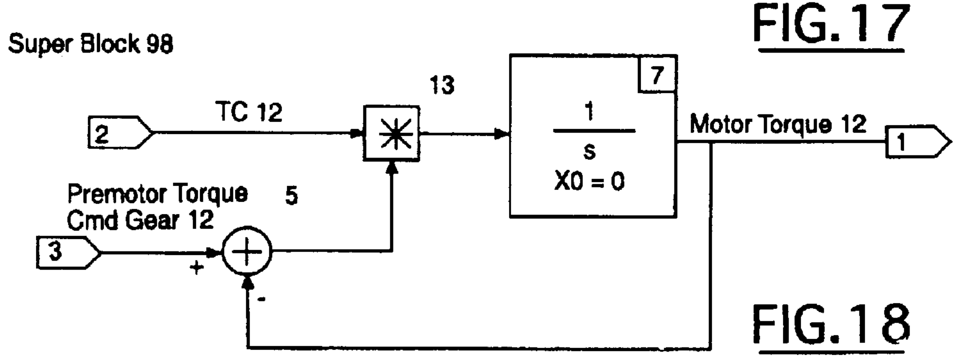
FIG. 18 is an enlargement of analog super block 98 of FIG. 2D.

A feedback system is provided for the controller 214 such that excessive fluctuation of halfshaft torque at 630 (FIG. 11E) will cause the controller 214 to signal T4 to move to the line T4 ADJ to lower T4. As a result, the clutch plates 210A, 210B will engage slower.

In shifting from first gear to second, T3 and T4 are equal. However for the shift from second gear to third, T4 is substantially higher than T3. Since there is less torsion transfer at the higher gears, the time constant can be increased or alpha can be increased to shorten the time period for clutch engagement.

The remainder of the present application gives a more detailed reference of the electronic circuitry utilized in bringing forth the present invention.

Figure 4A:
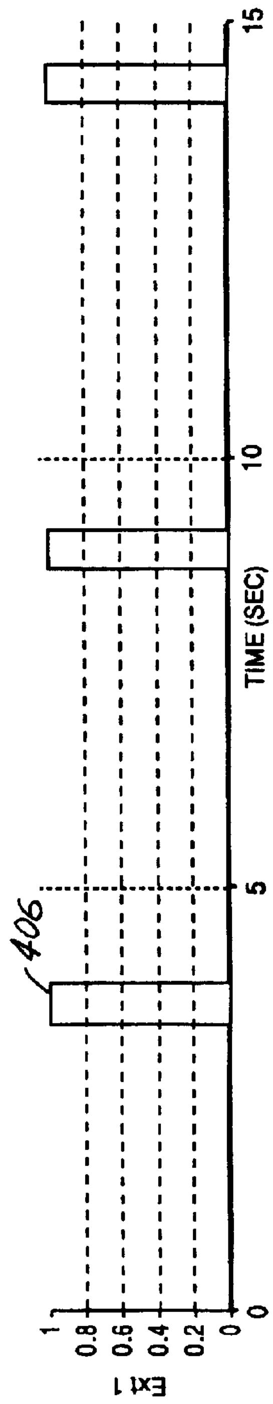
FIGS. 4A through 4I are graphic illustrations of various qualities brought about in the logic diagrams shown in FIGS. 2A and 2B.
Figure 4B:
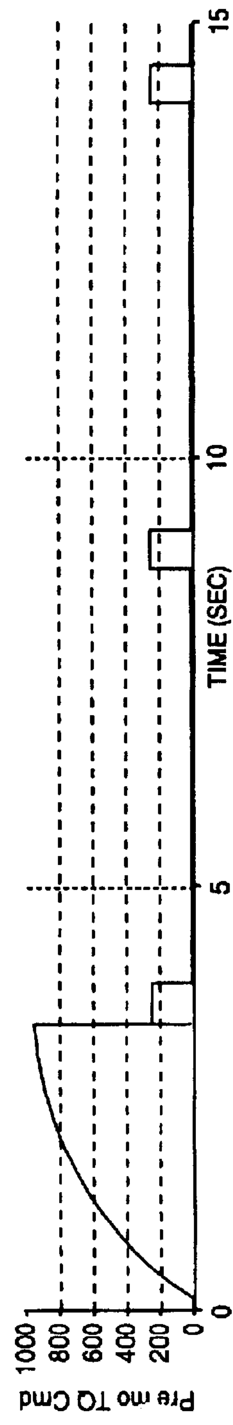
Figure 4C:
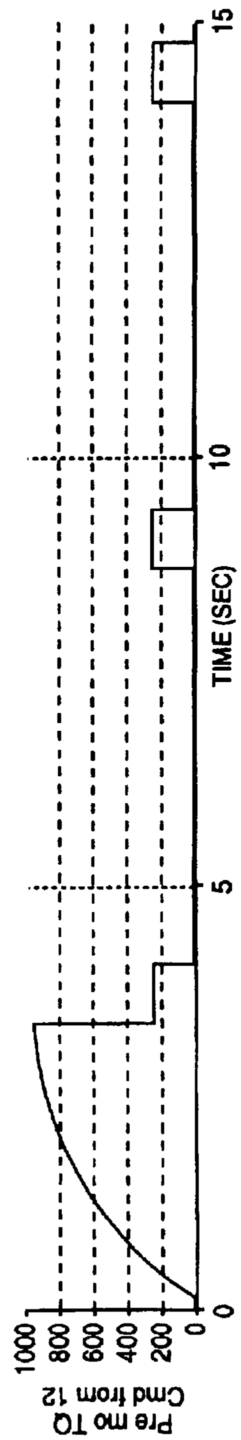
Figure 4D:
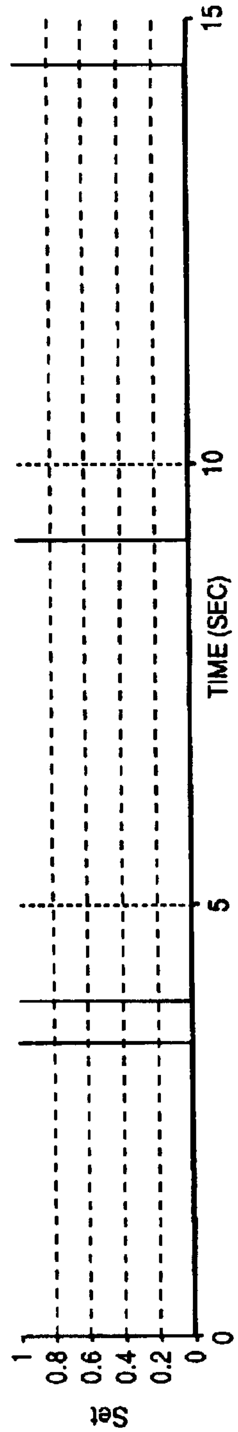
Figure 4E:
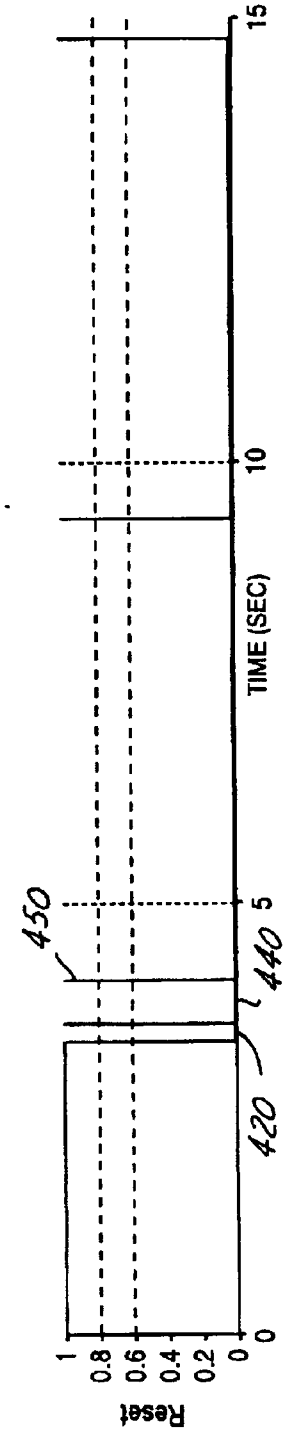
Figure 4F:
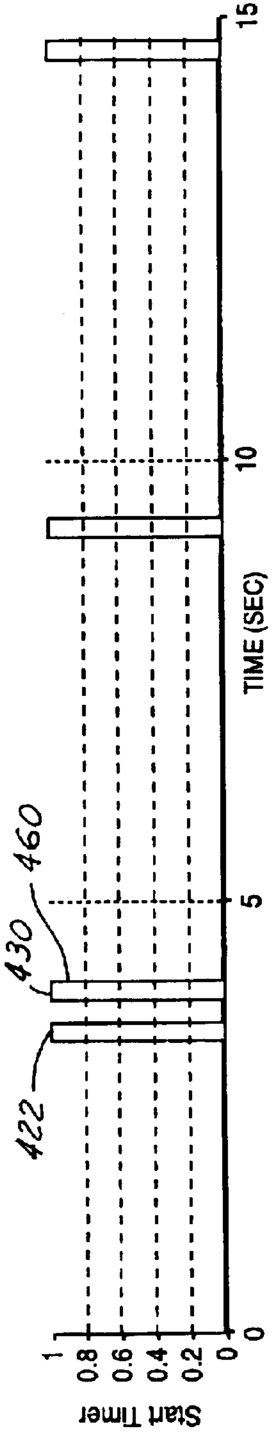
Figure 4G:
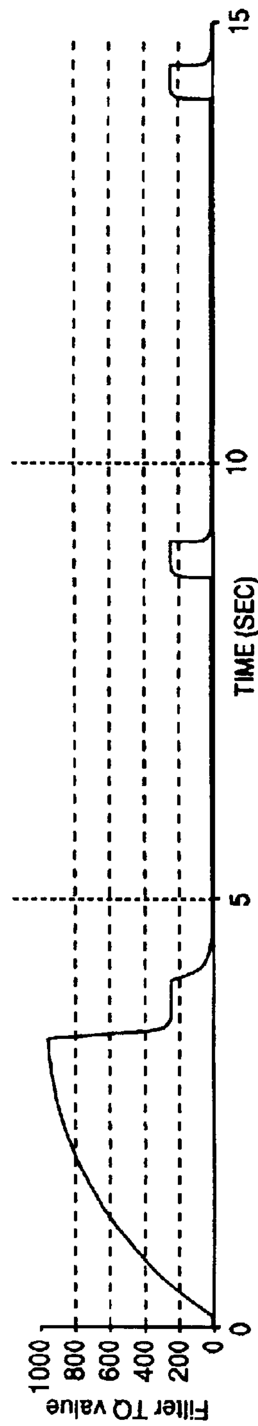
Figure 4H:
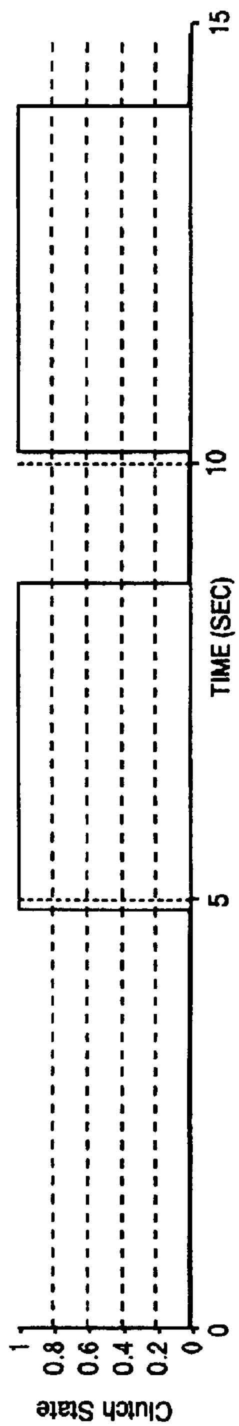
Figure 10:
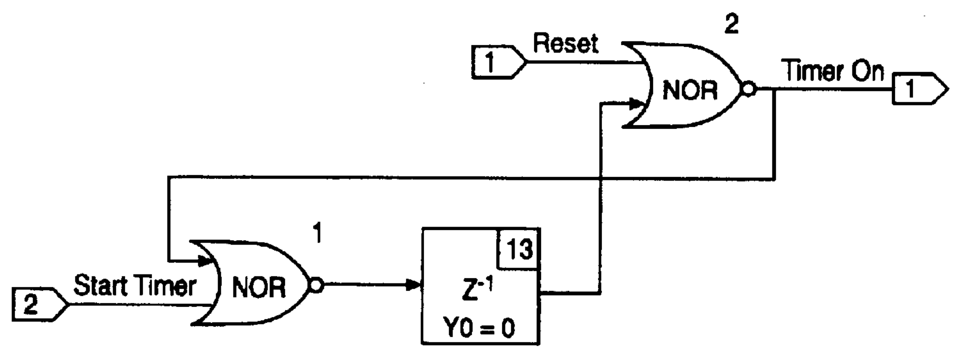
FIG. 10 is an enlargement of super block 16 of FIG. 2A.

The length of time that fill in torque value is applied is determined by several factors. When the vehicle is launching, motor only flag a is high (1). The reset line (FIG. 4E) to the RS flip_flop (Item 16 FIGS. 2A and 10) is high, forcing timer on=0 (timer is not running). Thus, pre motor torque cmd gear 12 (FIG. 4C) is set equal to pre motor torque cmd (FIG. 4B).

As the vehicle approaches the speed to shift, the controller changes state from motor only flag a to engine on and shift b. The engine clutch 210 is still disengaged, causing clutch state=0 (FIG. 4H) and motor assist with shift flag e or engine on and shift b, (hereafter referred to as ext 1) to go high at 406 (FIG. 4A). Pre motor torque cmd (FIG. 4B) is set to fill in torque value. Start timer (FIG. 4F), which also sets the RS flip_flop 16 (FIG. 2A), goes high for one sample when pre motor torque cmd (FIG. 4B) drops from motor torque cmd at wheels to fill in torque value. Reset goes low (420, FIG. 4E) due to motor only flag a going low. Timer on goes high (422, FIG. 4F) and remains so for a set amount of time.

Figure 9:
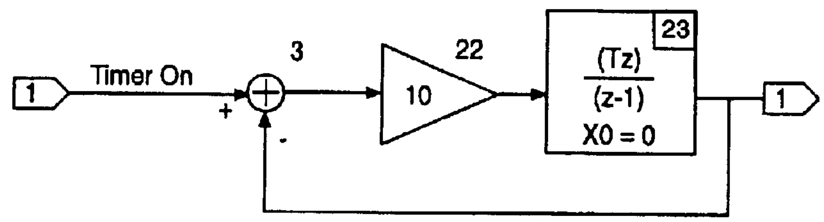
FIG. 9 is an enlargement of super block 15 of FIG. 2A.

Operation of lowpass timer superblock 15 (FIGS. 2A and 9) is described. A low pass filter is employed as a timer to measure a predetermined time span. Timer on, out of RS flip_flop super block 16 (FIG. 10) is input to a unity gain, digital lowpass filter, super block 15 (FIG. 2A) with a known, fixed time constant. The time it takes for the filtered value to reach some value, say 0.9 (FIG. 3), is fixed once the time constant ox is fixed. Then any desired time can be measured by adjusting the time constant of the filter and the threshold value.

In FIG. 3 ($\alpha$=0.10), a threshold value of 0.9 is reached in approximately 0.24 seconds, which is the amount of time torque fill in is required. When the timer expires, filtered value greater than threshold, the RS flip_flop 16 is reset and the timer is deactivated (440 FIG. 4E). The shift is finished and the motor torque command at wheels from the normal strategy is used.

When start timer is high, pre motor torque cmd gear 12 is set to the fill in torque value and is held at that value until the lowpass timer expires (26 FIG. 2A). When the timer expires, the RS flip_flop reset goes high, forcing timer on to go low, turning the timer off. In the simulation (FIG. 4A) ext 1 is still high for a time after the timer expires, holding pre motor torque cmd gear 12 equal to fill in torque value.

When the engine clutch 210 begins to engage, engine on and shift b goes low and motor assist with shift flag e is already low (ext 1=0) (FIG. 2A). Thus, pre motor torque cmd is set to motor torque cmd at wheels (which happens to be zero in the simulation shown). The start timer toggles high again (430 FIG. 4F) due to the decrease in motor torque. The reset (440 FIG. 4E) is still low, thus the timer on (output 6 FIG. 2A) toggles high. The timer on stays high until the lowpass timer (super block 15 FIG. 2A), times out. Once the lowpass timer times out, the reset toggles high (450 FIG. 4E), causing the timer on to go low (460 FIG. 4F).

When the timer on is high, the pre motor torque cmd gear 12 is the torque fill in value. When the timer on goes low, the pre motor torque cmd gear 12 becomes the motor torque cmd at wheels (which is zero in this run). The shift is complete. The fill in torque value is shown in the halfshaft torque trace at about 0 Nm. Without fill in torque value, the halfshaft torque drops to −200 Nm, as shown in FIG. 51 at 470.

At the time in the simulation when the second timer on goes low, the disengagement period of the shift is complete. The plot in FIG. 4G labeled filter TQ value shows the fill in torque value ramping down at this time. This ramping down occurs while the clutch 210 begins to engage. Viewing the graph of the halfshaft torque, FIG. 4I, during this ramping down, torque can be seen applied to the halfshaft. When the clutch state reaches one, the touchpoint on the engine clutch is obtained.

Figure 4I:
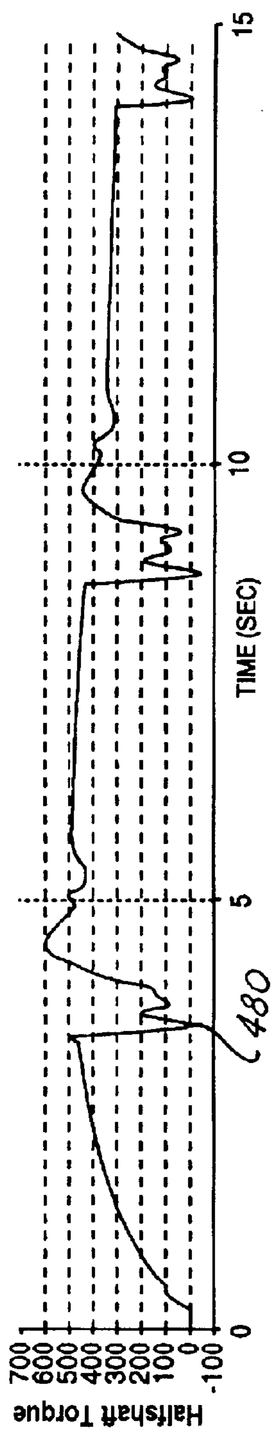

The shift from gear two to three is similar to the shift from one to two. The difference is that the motor is not providing traction to the wheels previous to the shift. This being the case, the motor only provides fill in torque. The drop in motor torque occurs only once, thus the start timer, reset and timer on toggle high once. The halfshaft torque, the torque the driver feels, is shown at the bottom of FIG. 4I.

Figure 5A:
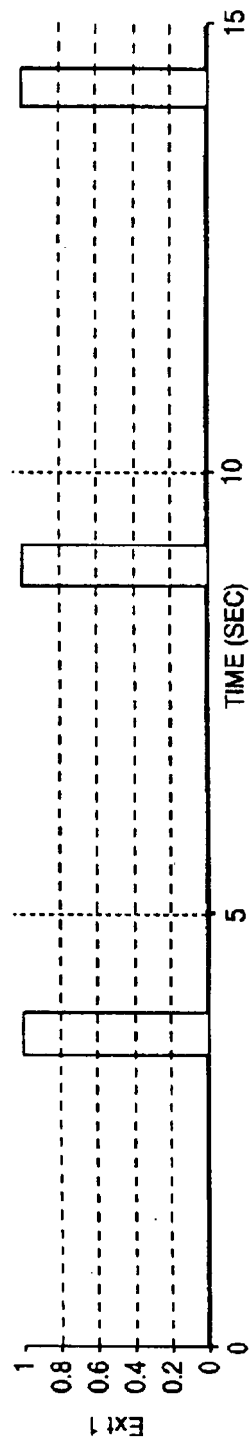
Figure 5B:
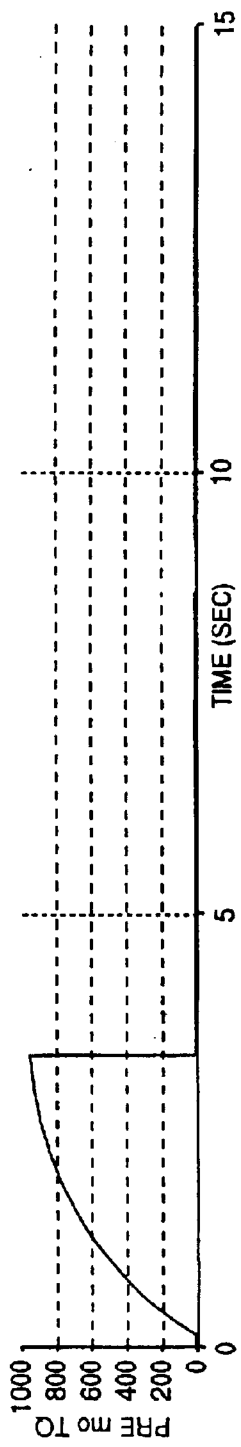
Figure 5C:
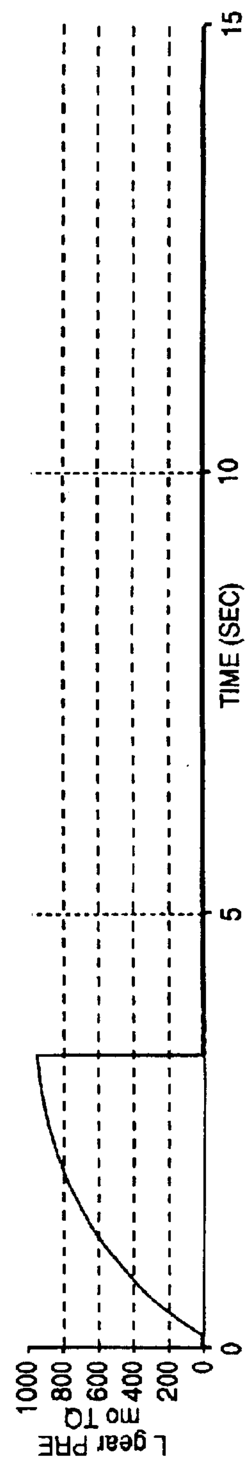
Figure 5D:
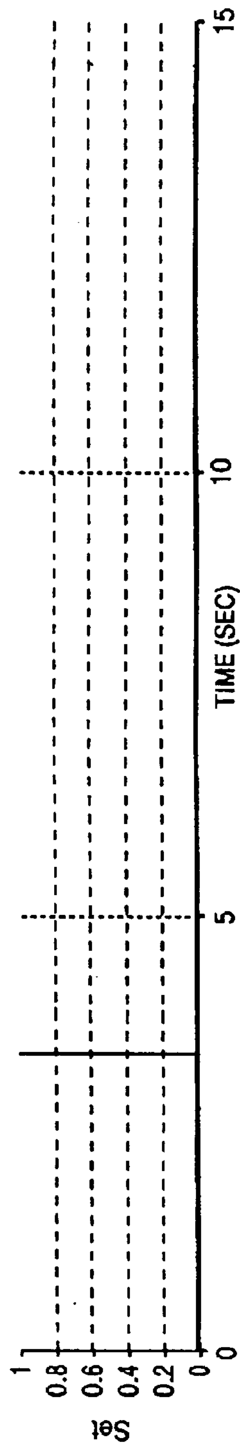
Figure 5E:
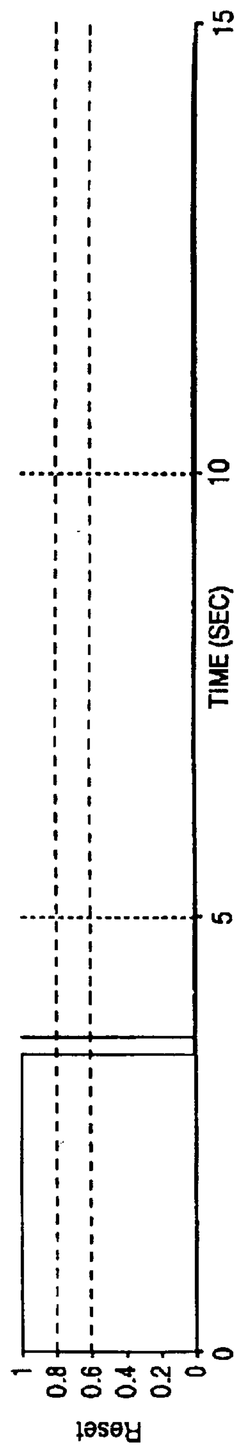
Figure 5F:
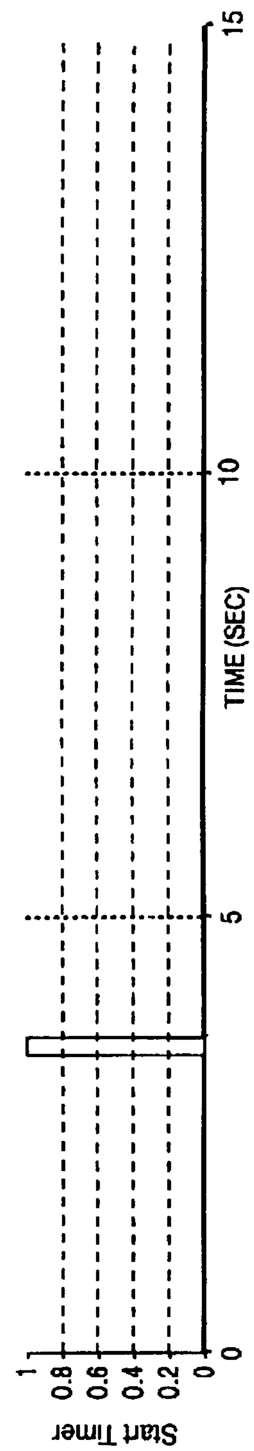
Figure 5G:
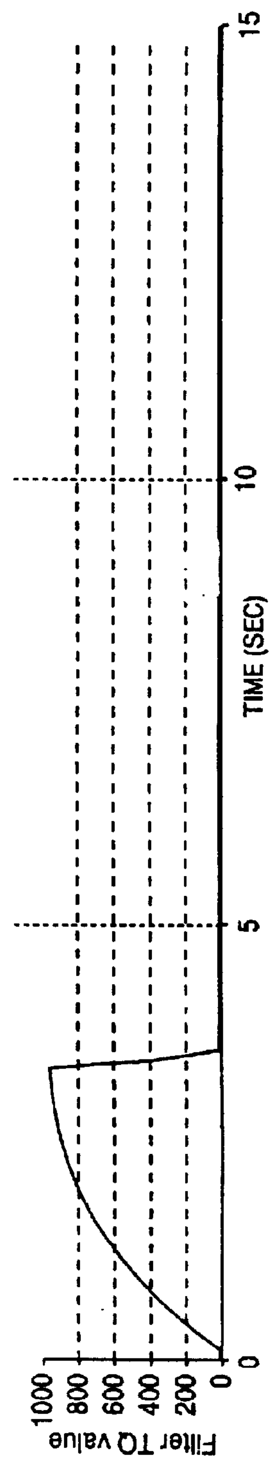
Figure 5H:
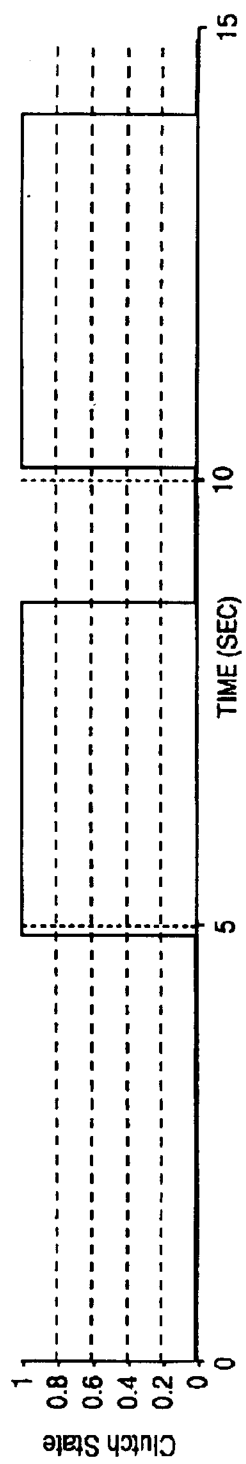
Figure 5I:
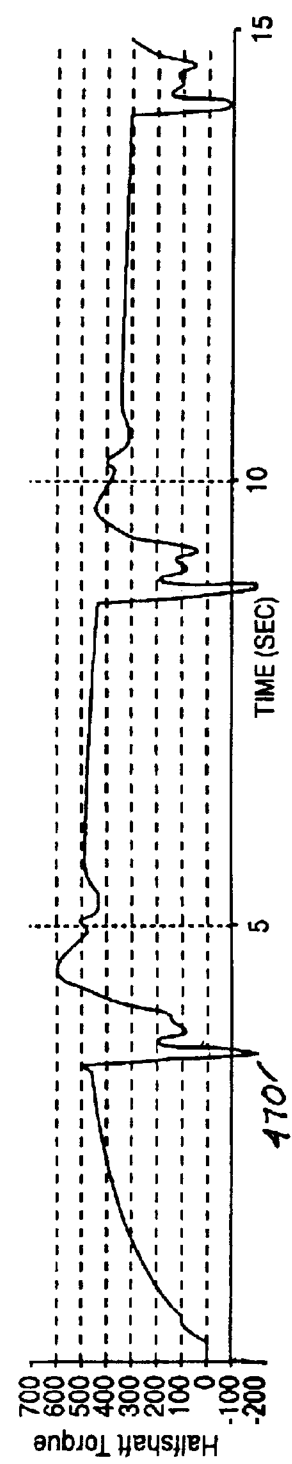

The halfshaft torque without fill in torque is shown at the bottom of FIG. 5I. With fill in torque, the halfshaft torque again drops only to zero Nm for an instant, with an average of about 100 Nm. The halfshaft torque without fill-in (470 FIG. 5I) again drops to 200 Nm with an average of about zero Nm. Choosing a motor with more torque capability can increase the torque fill in amount.

Figures 6A, 6B, 6C, 6D, 6E:
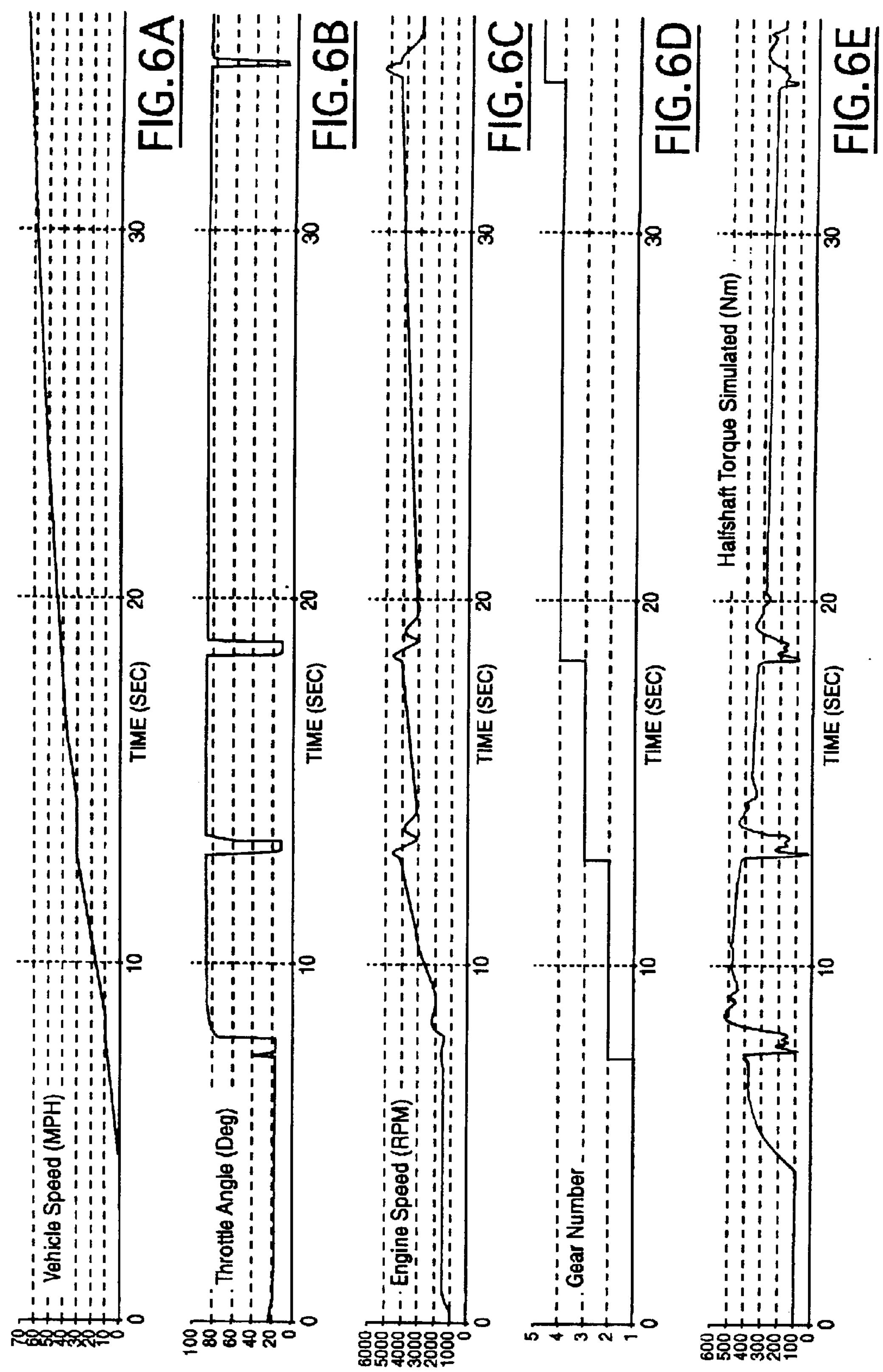
FIG. 6A is a graphic illustration of vehicle speed for a vehicle utilizing the present invention.
FIG. 6B is a graphic illustration of throttle angle for a vehicle utilizing the present invention.
FIG. 6C is a graphic illustration of engine speed for a vehicle utilizing the present invention.
FIG. 6D is a graphic illustration of gear number for a vehicle utilizing the present invention.
FIG. 6E is a graphic illustration of simulated halfshaft torque for a vehicle utilizing the present invention.

FIGS. 6A–6E depict the torque fill in algorithm working in the vehicle. The gearshift changes of FIGS. 6A–6E occur in a somewhat delayed manner than the gearshift changes for the simulation in FIGS. 4A–4I. As the vehicle accelerates, shown in the trace labeled vehicle speed (FIG. 6A), the throttle angle (FIG. 6B) of the engine, shown in the second trace, can be seen transitioning from 90 degrees to 10 degrees. These two traces are simulated. When the throttle angle is at 10 degrees the automated shift manual transmission 212 is shifting (FIG. 6D). The vehicle speed trace (FIG. 6A) also shows that the vehicle does not decelerate during a shift, due to the torque fill provided by the motor 202.

Figure 6F:
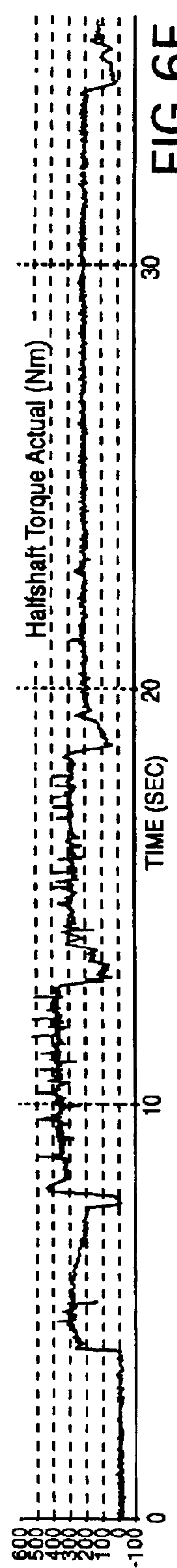
FIG. 6F is a graphic illustration of halfshaft torque values for a vehicle utilizing the present invention.
Figure 6G:
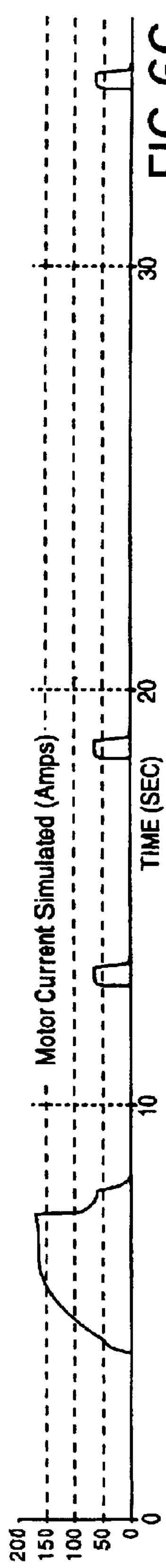
FIG. 6G is a graphic illustration of simulated motor current for a vehicle utilizing the present invention.
Figure 6H:
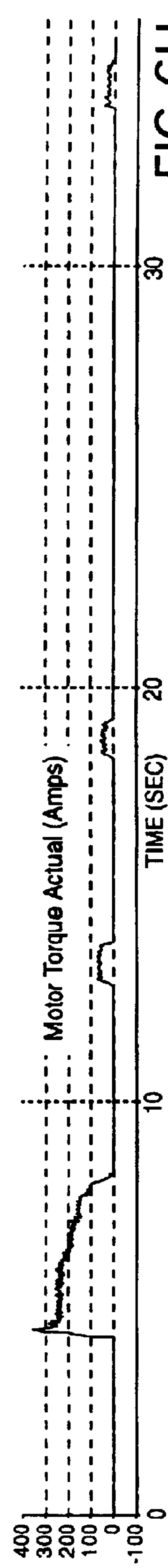
FIG. 6H is a graphic illustration of the actual measured motor current for a vehicle utilizing the present invention.
Figure 6I:
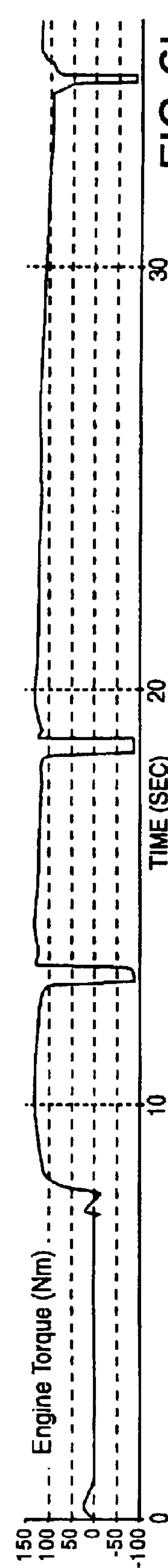
FIG. 6I is a graphic illustration of engine torque for a vehicle utilizing the present invention.

FIGS. 6F, GH and 6I illustrate the output of a vehicle of the present invention. It can be seen from a comparison of FIG. 6F that actual half-shaft torque comes out in a manner generally close to that simulated in FIG. 6E. The motor torque as defined by the measured amperage of the motor also shows a correlation with the simulated torque output of the motor provided in FIG. 6G. The measure of engine torque in FIG. 6I is also provided for comparison purposes.

A feature of the present invention is that the hardware for different transmissions is essentially the same whether in an identical vehicle or one of another make or model. The required modifications will mainly be to the time constants (assuming motor torque is sufficient).

Although the present invention has been explained in various embodiments, it will be apparent to those skilled in the art that various modifications can be made to the present invention without departing from the spirit and scope of the invention as defined by the accompanying claims.

What is claimed is:

1. A method of operating a hybrid electric vehicle having an internal combustion engine connected to a layshaft automated transmission via a clutch and an electrical motor torsionally connected to a drive axle via a differential opposite a torsional connection of said transmission with said drive shaft, said method comprising:

opening said clutch to torsionally isolate said engine from said transmission;

changing a gear of said transmission; and adding torque filtered under a time constant from said motor to said differential while said engine is disengaged from said transmission.

2. A method as described in claim 1, wherein said time constant is digitally generated.

3. A method as described in claim 1, wherein said time constant is analog generated.

4. A method as described in claim 1, wherein said time constant differs for different gears of said transmission.

5. A method as described in claim 1, wherein said time constant differs for when said clutch opens and when said clutch closes.

6. A method as described in claim 1, wherein said time constant differs for when said clutch is opened from being fully engaged to a touchpoint, and from said touchpoint to said clutch being fully opened.

7. A method as described in claim 6, wherein said time constant differs when said clutch is being closed wherein said clutch is fully opened to a touchpoint and from said touchpoint to said clutch being fully engaged.

8. A method as described in claim 1, wherein said time constant differs when said clutch is being closed wherein said clutch is fully opened to a touchpoint and from said touchpoint to said clutch being fully engaged.

9. A method as described in claim 1, wherein said time constant is varied based upon a change in oscillations of a rotational quality of said drive axle.

10. A method of operating a hybrid electric vehicle having an internal combustion engine connected to a multiple gear layshaft automated transmission via a clutch and an electric motor torsionally connected to a drive axle via a differential opposite a torsional connection of said transmission with said drive shaft, said method comprising:

opening said clutch to torsionally isolate said internal combustion engine from said transmission;

changing a gear of said transmission;

adding torque from said motor to said differential while said engine is disengaged from said transmission, said torque being added under a first time constant from full clutch engagement to a touchpoint disengagement, said torque being additionally added under a second time constant from touchpoint disengagement of said clutch until said clutch is fully opened, said torque being added under a third time constant from a fully opened position of said clutch to a closed touchpoint engagement of said clutch, and said torque being added to said axle under a fourth time constant from a touchpoint engagement of said clutch.

11. A method as described in claim 10, wherein said time constants vary dependent upon a gear of said transmission.

12. A hybrid electric vehicle comprising:

an internal combustion engine;

an automatic transmission;

a clutch for selectively connecting said internal combustion engine with said transmission;

a differential torsionally connected with said transmission;

a drive axle powered by said differential;

an electric motor torsionally connected with said differential generally opposite said torsional connection of said transmission with said differential; and a controller to command said electric motor to provide torque to said differential when said transmission is in a midst of a change in gear.

13. A hybrid electric vehicle as described in claim 12, wherein said automatic transmission is a layshaft transmission.

14. A hybrid electric vehicle as described in claim 12, wherein said controller commands said motor to fill in torque to said differential under a time constant.

15. A hybrid electric vehicle as described in claim 14, wherein said time constant varies for different gears of said transmission.

16. A hybrid electric vehicle as described in claim 14, wherein said time constant differs for when said clutch opens and when said clutch closes.

17. A hybrid electric vehicle as described in claim 14, wherein said time constant differs for when said clutch is fully engaged to a touchpoint and from said touchpoint to said clutch being fully opened.

18. A hybrid electric vehicle as described in claim 17, wherein said time constant differs when said clutch is being closed from said clutch being fully opened to a touchpoint engagement and from said touchpoint engagement to said clutch being fully engaged.

19. A hybrid electric vehicle as described in claim 14, wherein said time constant differs when said clutch is being closed from said clutch being fully opened to touchpoint engagement and from said touchpoint engagement to said clutch being fully engaged.

20. A hybrid electric vehicle as described in claim 14, wherein said controller changes said time constant as a result of oscillations in rotational quality of said drive axle.

21. A hybrid electric vehicle comprising:

an internal combustion engine;

an automatic transmission;

a clutch for selectively connecting said internal combustion engine with said transmission;

a differential torsionally connected with said transmission;

a drive axle powered by said differential;

an electric motor torsionally connected with said differential generally opposite said torsional connection of said transmission with said differential; and a controller to command said electric motor to provide torque to said differential when said transmission is in a midst of a change in gear;

said controller adding torque from said motor to said differential while said engine is disengaged from said transmission, said torque being added under a first time constant from full clutch engagement to a touchpoint disengagement, said torque being added under a second time constant from touchpoint disengagement of said clutch until said clutch is fully opened, said torque being added under a third time constant from a fully opened position of said clutch to a closing touchpoint engagement of said clutch, and said torque being added to said axle under a fourth time constant from a touchpoint engagement of said clutch.

22. A hybrid electric vehicle as described in claim 21, wherein said time constants vary dependent upon a gear ratio of said transmission.

* * * * *